US011586991B2

(12) United States Patent
Skaling

(10) Patent No.: US 11,586,991 B2
(45) Date of Patent: Feb. 21, 2023

(54) SECURE ON-DEMAND TRANSPORTATION SERVICE

(71) Applicant: Whitney Skaling, Buellton, CA (US)

(72) Inventor: Whitney Skaling, Buellton, CA (US)

(*) Notice: Subject to any disclaimer, the term of this patent is extended or adjusted under 35 U.S.C. 154(b) by 795 days.

(21) Appl. No.: 16/389,393

(22) Filed: Apr. 19, 2019

(65) Prior Publication Data

US 2020/0334581 A1    Oct. 22, 2020

(51) Int. Cl.
*G06Q 10/02* (2012.01)
*G06Q 50/30* (2012.01)
*H04W 12/069* (2021.01)

(52) U.S. Cl.
CPC ........... *G06Q 10/02* (2013.01); *G06Q 50/30* (2013.01); *H04W 12/069* (2021.01)

(58) Field of Classification Search
CPC ...... G06Q 10/02; G06Q 50/30; H04W 12/069
See application file for complete search history.

(56) References Cited

U.S. PATENT DOCUMENTS

| 8,403,225 B2 | 3/2013 | Sharra et al. | |
|---|---|---|---|
| 8,768,565 B2 | 7/2014 | Jefferies et al. | |
| 8,781,910 B2 | 7/2014 | McRae et al. | |
| 2011/0112969 A1 | 5/2011 | Zaid | |
| 2014/0278608 A1* | 9/2014 | Johnson | B60R 25/24 705/5 |
| 2014/0279707 A1* | 9/2014 | Joshua | G06Q 30/0283 701/1 |

(Continued)

FOREIGN PATENT DOCUMENTS

| CN | 203920247 U | 4/2014 |
|---|---|---|
| CN | 106022202 A | 10/2016 |

(Continued)

OTHER PUBLICATIONS

Arulprakash M., Aditya Kamal and Aishwarya Manisha, "QR-Code Scanner Based Vehicle Sharing", May 2018, ARPN Journal of Engineering and Applied Sciences, vol. 13, No. 10, pp. 3441-3448 (Year: 2018).*

(Continued)

*Primary Examiner* — Jeff Zimmerman
*Assistant Examiner* — Wayne S. Murray
(74) *Attorney, Agent, or Firm* — Lyon & Harr, LLP; Richard T. Lyon

(57) ABSTRACT

A secure on-demand transportation service provides transportation to a passenger at a specified pick-up location. To this end, a transportation request is received from a passenger application running on a passenger's mobile computing device. A vehicle is assigned to provide the requested transportation, and an encrypted data package is generated which includes encrypted information that is unique to the current transportation request. The encrypted data package is provided to a vehicle application and displayed on an externally visible display associated with the vehicle at the pick-up location. The displayed encrypted data package is scanned by the passenger and the passenger application compares the scanned data to previously received data to determine if there is a match. If so, the passenger is informed and a match message is sent. The match message confirms that the vehicle has arrived at the pick-up location and that the passenger has found the vehicle.

24 Claims, 22 Drawing Sheets

(56) References Cited

U.S. PATENT DOCUMENTS

| | | |
|---|---|---|
| 2015/0220991 A1 | 8/2015 | Butts et al. |
| 2016/0027079 A1 | 1/2016 | Schoeffler |
| 2016/0292596 A1 | 10/2016 | Gaitan et al. |
| 2017/0053246 A1 | 2/2017 | Shubat |
| 2017/0115125 A1 | 4/2017 | Outwater |
| 2017/0213403 A1 | 7/2017 | Diehl et al. |
| 2018/0098194 A1 | 4/2018 | Brown et al. |
| 2018/0102017 A1 | 4/2018 | Brinig et al. |
| 2018/0118164 A1 | 5/2018 | Wood |
| 2018/0186309 A1 | 7/2018 | Batten et al. |
| 2018/0189919 A1 | 7/2018 | Brendlinger et al. |
| 2018/0190110 A1 | 7/2018 | Demisse et al. |
| 2018/0204399 A1 | 7/2018 | Newman |
| 2018/0299895 A1* | 10/2018 | Knotts ............... H04L 67/12 |
| 2020/0250611 A1* | 8/2020 | Pourteymour .......... G06F 9/542 |
| 2020/0349345 A1* | 11/2020 | Hodge ................. G06Q 50/30 |
| 2020/0349666 A1* | 11/2020 | Hodge ................. G08G 1/017 |

FOREIGN PATENT DOCUMENTS

| | | |
|---|---|---|
| CN | 103241215 B | 12/2016 |
| CN | 106934682 A | 7/2017 |
| CN | 107241423 A | 10/2017 |
| CN | 107590631 A | 1/2018 |
| CN | 107590913 A | 1/2018 |
| WO | 2011145976 A1 | 11/2011 |
| WO | 2015173829 A1 | 11/2015 |
| WO | 2016061048 A1 | 4/2016 |
| WO | 2018098341 A1 | 5/2018 |

OTHER PUBLICATIONS

Dynamic ride sharing service: are users ready to adopt it?, E. Gargiulo, R. Giannantonio, E. Guercio, C. Borean, G. Zenezini, Procedia Manufacturing, 2015, vol. 3, pp. 777-784.

How do I know if the Uber driver is who he says he is?, Ride Guru, George C. Cromwell, Jun. 22, 2018, https://ride.guru/lounge/p/how-do-i-know-if-the-uber-driver-is-who-he-says-he-is, pp. 1-2.

Lyft's first app-based scooter service rolls into Denver, Digital Trends, Trevor Mogg, Sep. 6, 2018, https://www.digitaltrends.com/outdoors/lyft-launches-its-first-app-based-scooter-service/, pp. 1-2.

PCT Application No. PCT/US202/027403, Search Report and Written Opinion, dated Jul. 24, 2020, pp. 1-14.

International Preliminary Report on Patentability, PCT/US2020/027403, dated Mar. 29, 2021, pp. 1-4.

* cited by examiner

SECURE ON-DEMAND TRANSPORTATION SERVICE

BACKGROUND

The Internet is a global data communications system that serves billions of people across the globe and provides them access to a vast array of online information resources and services including those provided by the World Wide Web and intranet-based enterprises. Thanks to the ubiquity of the Internet and the wide variety of network-enabled end-user computing devices that exist today, many of which are mobile computing devices, people today increasing depend on online communications (e.g., using various types of end-user computing devices that are configured to operate over a data communication network such as the Internet, among other types of networks). For example, many people today use transportation network companies (e.g., ride-sharing services like Uber, a trademark of Uber Technologies Inc. and Lyft, a trademark of Lyft, Inc.) to obtain transport. In general, a passenger employs an application running on their mobile computing device (e.g., smart phone, etc.) to contact a transportation network company in order to contract for a vehicle (autonomous or with a driver) to meet them at a specified pick-up location and provide transport to a desired destination. For the most part, a transportation network company uses an online-enabled platform to connect passengers with ride-providing vehicles. For the purposes of the following descriptions, the service provided by a transport network company will be referred to as an on-demand transportation service.

SUMMARY

Secure on-demand transportation service implementations described herein generally provide on-demand transportation to a passenger at a specified pick-up location in a secure manner. In one exemplary implementation, the secure on-demand transportation service receives a transportation request from a passenger application running on a passenger's mobile computing device. This transportation request specifies a pick-up location. A vehicle is then assigned to provide the requested transportation and the specified pick-up location is provided to a vehicle application running on a mobile computing device associated with the assigned vehicle, or a driver of the vehicle, or both. Next, an encrypted data package is generated which includes encrypted information that is unique to the current transportation request. The encrypted data package is displayable on an externally visible display associated with the vehicle and scannable by an image sensor disposed in the passenger's mobile computing device. The encrypted data package is provided to the vehicle application for display via the externally visible display at the pick-up location. The encrypted data package is also provided to the passenger application. In this way, the encrypted data package displayed on the externally visible display associated with the vehicle when the vehicle arrives at the pick-up location can be scanned by the passenger using the passenger's mobile computing device. Upon scanning, the passenger application would compare the scanned package data to corresponding data found in the encrypted data package received by the passenger application to determine if there is a match. If so, the passenger would be informed via the passenger's mobile computing device that a match has occurred. In addition, in one version when a match occurs, a match message is received from the passenger application via the passenger's mobile computing device. The match message indicates that a match has occurred, thereby confirming that the vehicle has arrived at the pick-up location and that the passenger has found the vehicle.

In another exemplary implementation, the secure on-demand transportation service receives a transportation request from a passenger application running on a passenger's mobile computing device. This transportation request specifies a pick-up location. A vehicle is then assigned to provide the requested transportation and the specified pick-up location is provided to a vehicle application running on a mobile computing device associated with the assigned vehicle, or a driver of the vehicle, or both. Next, an encrypted data package is generated which includes encrypted information that is unique to the current transportation request. The encrypted data package is displayable on an externally visible display associated with the vehicle and scannable by an image sensor disposed in the passenger's mobile computing device. The encrypted data package is provided to the vehicle application for display via the externally visible display at the pick-up location. In this implementation, a security data package is generated. The security data package includes the aforementioned information that is unique to the current transportation request, and is provided to the passenger application. This information found in the security data package can be compared to information obtained when the encrypted data package displayed on the externally visible display associated with the vehicle is scanned by the passenger and decrypted using the passenger application, which includes a decryption tool that is capable of decrypting the encrypted information found in the encrypted data package. It is then determined if there is a match. If so, the passenger would be informed via the passenger's mobile computing device that a match has occurred. In addition, when a match occurs, a match message is received from the passenger application via the passenger's mobile computing device. The match message indicates that a match has occurred, thereby confirming that the vehicle has arrived at the pick-up location and that the passenger has found the vehicle.

In yet another implementation, a secure on-demand transportation application resident on the computing device associated with the passenger, sends a transportation request to the secure on-demand transportation service. This request specifies a pick-up location. In response, information pertaining to a vehicle assigned to provide the requested transportation is received. An encrypted data package is then generated, which includes encrypted information that is unique to the current transportation request. The encrypted data package is displayable on an externally visible display associated with the vehicle and scannable by an image sensor disposed in the passenger's mobile computing device. The encrypted data package is sent to the vehicle application running on a mobile computing device associated with the assigned vehicle, or a driver of the vehicle, or both for display via the externally visible display at the pick-up location. Data scanned by the passenger mobile computing device from the encrypted data package displayed on the externally visible display associated with the vehicle is compared to corresponding data found in the generated encrypted data package to determine if there is a match. If so, the passenger is informed via the passenger mobile computing device that a match has occurred.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the secure on-demand transportation service implementations described herein will become better understood with regard to the following description, appended claims, and accompanying drawings where:

DETAILED DESCRIPTION

Figure 1:
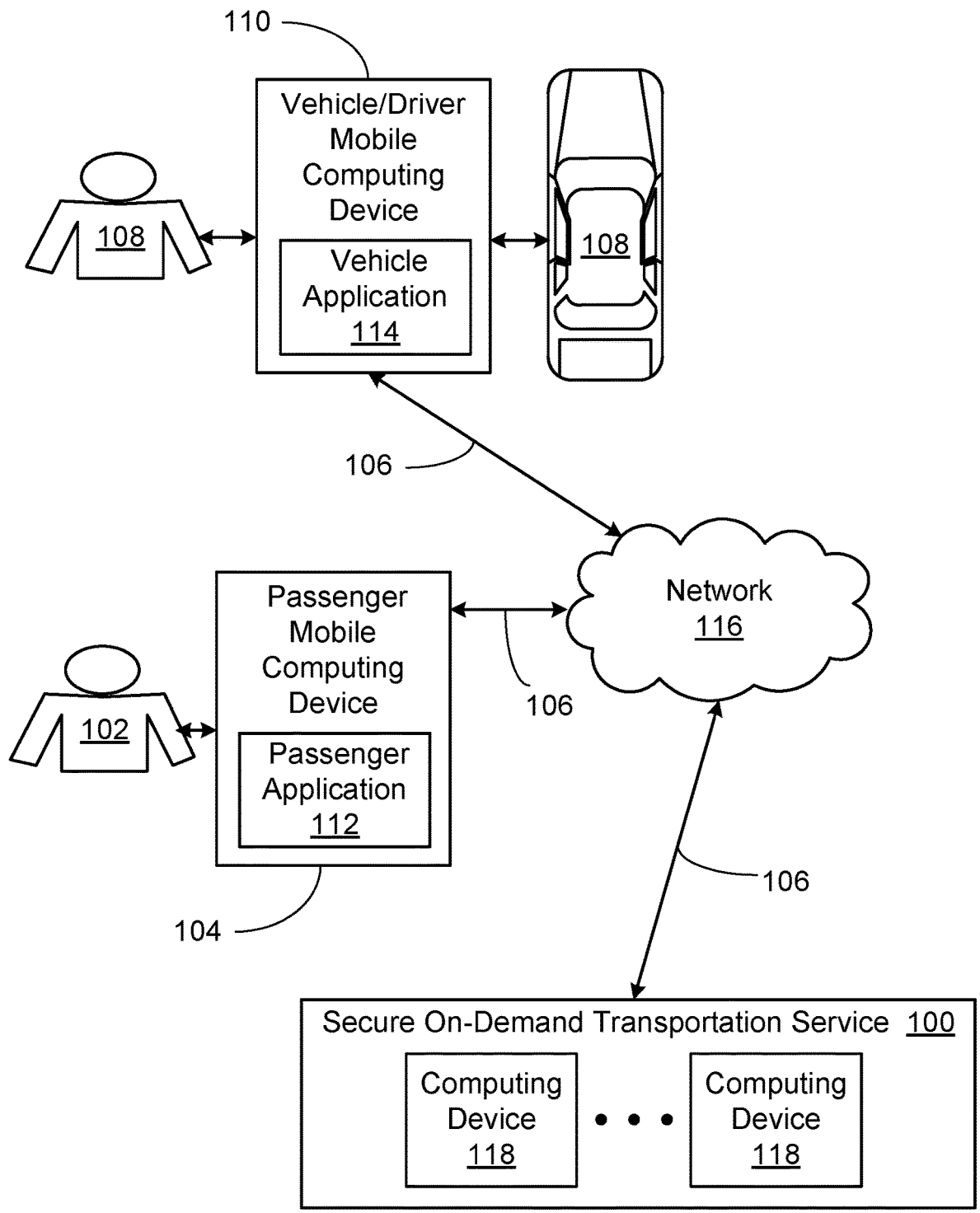
FIG. 1 is a diagram illustrating one implementation, in simplified form, of a system framework for realizing the secure on-demand transportation service (SO-DTS) implementations described herein.

In the following description of secure on-demand transportation service (SO-DTS) implementations reference is made to the accompanying drawings which form a part hereof, and in which are shown, by way of illustration, specific implementations in which the SO-DTS can be practiced. It is understood that other implementations can be utilized and structural changes can be made without departing from the scope of the secure on-demand transportation service implementations.

It is also noted that for the sake of clarity specific terminology will be resorted to in describing the secure on-demand transportation service implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "some implementations", or "one version", or "another version", or an "exemplary version", or an "alternate version", or "some versions", or "one variant", or "another variant", or an "exemplary variant", or an "alternate variant", or "some variants" means that a particular feature, a particular structure, or particular characteristics described in connection with the implementation/version/variant can be included in one or more implementations of the secure on-demand transportation service. The appearances of the phrases "in one implementation", "in another implementation", "in an exemplary implementation", "in an alternate implementation", "in some implementations", "in one version", "in another version", "in an exemplary version", "in an alternate version", "in some versions", "in one variant", "in another variant", "in an exemplary variant", "in an alternate variant" and "in some variants" in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants of the secure on-demand transportation service does not inherently indicate any particular order nor imply any limitations of the secure on-demand transportation service.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," and variants thereof, and other similar words are used in either this detailed description or the claims, these terms are intended to be inclusive, in a manner similar to the term "comprising", as an open transition word without precluding any additional or other elements.

1.0 Secure On-Demand Transportation Service

Referring to FIG. 1, in an on-demand transportation service system framework, a passenger 102 who wishes transportation requests a ride using a mobile computing device 104 that is configured to communicate various types of information over a conventional data communication network 116 (herein also referred to as a computer network) such as the Internet (among other types of conventional data communication networks) via a secured communication channel 106. The mobile computing device 104 can be any type of conventional mobile computing device such as a smartphone, or a tablet computer, or a laptop computer (sometimes also referred to as a notebook or netbook computer), or a computing device that is integrated into an automobile (e.g., a car, or a truck, or any other type of motorized vehicle), among other types of conventional mobile computing devices. It is assumed for the purposes of the following description that a secured communication channel 106 is used for all communication between the secure on-demand transportation service (SO-DTS) 100 (which runs on one or more computing devices 118) and the passenger's mobile computing device 104 so as to ensure the passenger communications are authentic (and vice versa). The same assumption is made for communications between the SO-DTS 100 and the vehicle, or driver, or both 108 providing transportation to a passenger 102, and in any communications between the passenger's mobile computing device 104 and a mobile computing device 110 associated with the vehicle, or driver, or both 108. The mobile computing device 110 can also be any type of conventional mobile computing device, such as those described above in reference to the passenger's mobile computing device. In an on-demand transportation scenario, the foregoing secure communications are facilitated using an application 112 that is resident on the passenger's mobile computing device 104 (hereinafter sometimes referred to as the "passenger application"), or an application 114 that is resident on the mobile computing device 110 associated with the vehicle, or driver, or both 108 (hereinafter sometimes referred to as the "vehicle application"). In the case of the SO-DTS implementations described herein, the passenger and vehicle applications 112, 114 are provided by the SO-DTS 100 ahead of time in the conventional manner currently employed by on-demand transportations systems.

As illustrated in FIG. 1, transportation is provided to a passenger 102, by a vehicle 108. In some implementations, the vehicle is an autonomous vehicle not having a driver. In other implementations, the vehicle has a driver. For the sake of convenience, in the descriptions to follow, the term "vehicle/driver" will sometimes be used as a shorthand for the phrase "vehicle, or its driver, or both". Thus, for example when referring to a "vehicle/driver's mobile computing device", this would refer to a device associated with a vehicle, or its driver, or both.

Figure 2A:
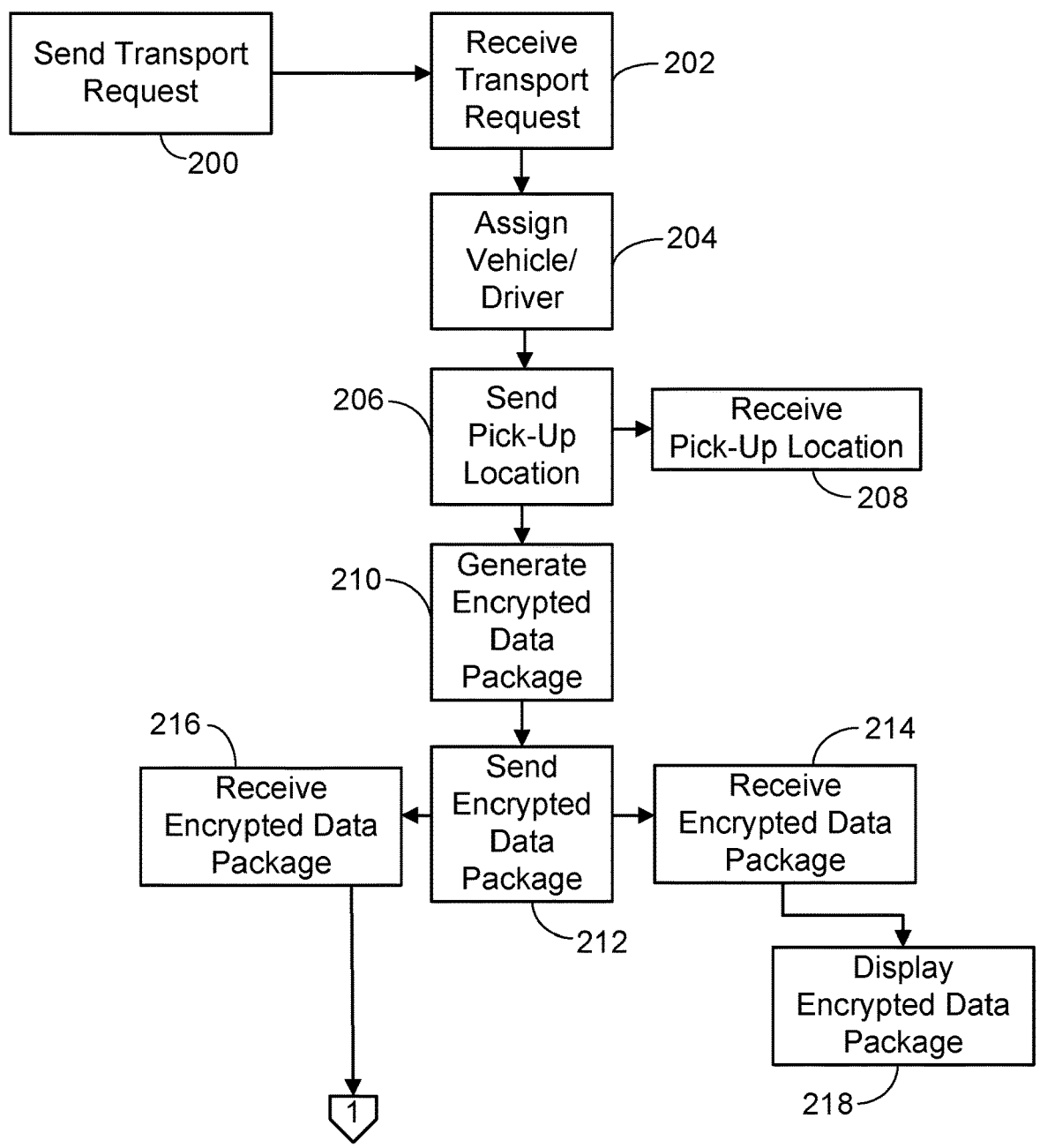
FIGS. 2A-C are a flow diagram illustrating an exemplary implementation, in simplified form, of sub-programs for providing on-demand transportation to a passenger where an encrypted data package is sent to both vehicle and passenger applications running on their respective mobile computing devices.
Figure 2B:
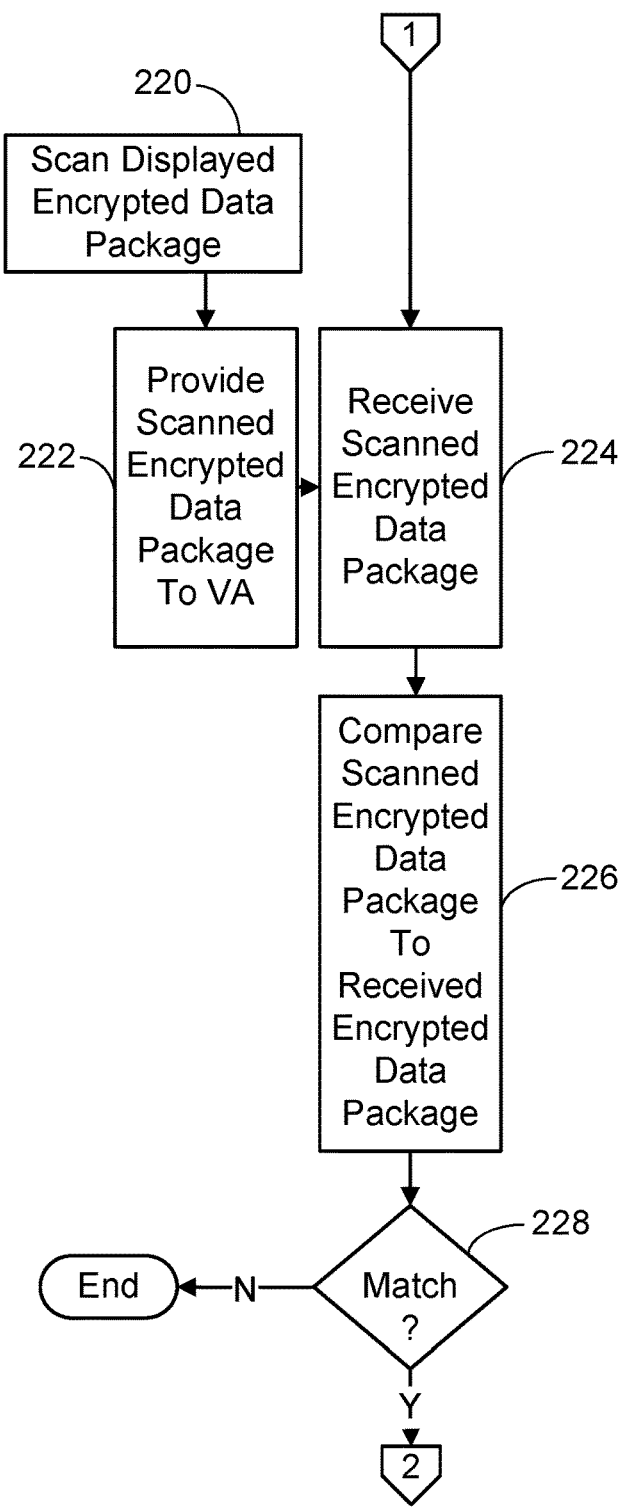
Figure 2C:
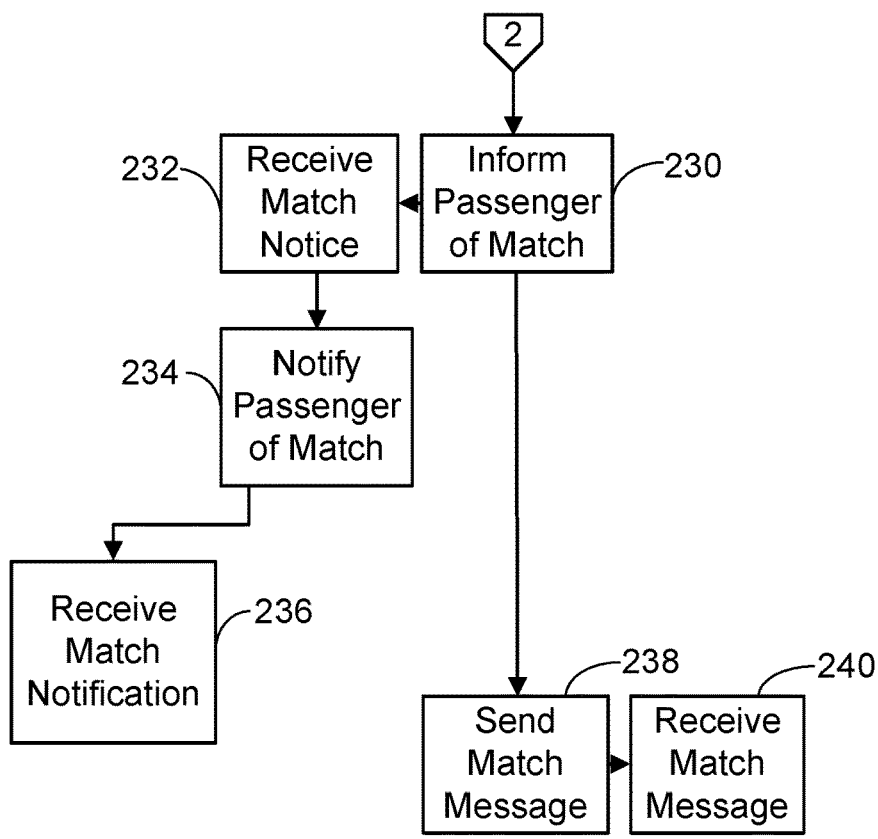

In view of the foregoing system framework of FIG. 1, in one exemplary implementation, the SO-DTS generates and provides a copy of an encrypted data package to both the vehicle and passenger applications. More particularly, referring to FIGS. 2A-C, on-demand transportation is provided to a passenger at a specified pick-up location by a system and computer program that involves executing sub-programs on one or more computing device such as that described in more detail in the Exemplary Operating Environments section which follows. It is also noted that in FIGS. 2A-C (as well as FIG. 3-15) the abbreviations "pass" (passenger), "PMCD" (passenger mobile computing device), "PA" (passenger application), "SO-DTS" (secure on-demand transportation service), "VA" (vehicle application), "V/D MCD" (vehicle/driver mobile computing device) and "V/D" (vehicle/driver) are employed to save space. First, the passenger sends (action 200) via the passenger application running on the mobile computing device, and the SO-DTS receives (action 202), a transportation request. This request, among other things, specifies the pick-up location. In response, the SO-DTS assigns a vehicle/driver to provide the requested transportation (action 204). The assigned vehicle/driver is then contacted by the SO-DTS via the vehicle application running on the mobile computing device associated with the vehicle/driver. The SO-DTS then sends (action 206) and the vehicle/driver receives via the vehicle/driver mobile computing device (action 208), among other things, the specified pick-up location.

In one implementation, the SO-DTS generates an encrypted data package (action 210). This data package includes encrypted information that is unique to the current transportation request. As such, when decrypted this information can be used to identify the current transportation request and differentiate it from all other transportation requests. Various encryption techniques can be employed to encrypt/decrypt the encrypted data package and other data transferred between the SO-DTS and the passenger application or vehicle application, or between the passenger application and the vehicle application. In general, any symmetric key encryption technique (e.g., advanced encryption standard (AES), triple data encryption standard (3DES), twofish, blowfish, and so on) or public key encryption technique (e.g., RSA) that is compatible with the data being transferred can be employed. In particular, the encryption/ decryption can be a one-time event (e.g., so-called one-time pad or key encryption) unique to the transportation request so that past or future keys cannot be used to decrypt the data. In one version, the package also includes proprietary information that is unique to, and identifies, the particular SO-DTS generating the encrypted data package.

The encrypted data package is displayable on an externally visible display associated with the vehicle and scannable by an image sensor disposed in the passenger's mobile computing device. The encrypted data package can take various forms as will be described in paragraphs to follow. In addition, the types of displays that are capable of displaying the package will be described later. In general though, the encrypted data package is displayed on a display disposed on or in the vehicle in such a way that it is visible from the outside of the vehicle and readily scannable by the passenger's mobile computing device. In one implementation, more than one display is employed, each of which display the encrypted data package. For example, a display can be located inside the vehicle and visible through one of the vehicle's windows. A display could also be located outside on the roof of the vehicle.

Referring again to FIG. 2, the SO-DTS sends (action 212) the encrypted data package to both the vehicle and passenger applications via their respective mobile computing devices. The encrypted data package is then received by the vehicle and passenger applications (actions 214, 216). The package is displayed via the externally visible display associated with the vehicle at the pick-up location when the vehicle arrives (action 218). The passenger scans the displayed encrypted data package using their mobile computing device (action 220) and provides the scanned package data to the passenger application (action 222). The passenger's mobile computing device uses an onboard sensor (e.g., a camera) to scan the displayed encrypted data package. The passenger application receives the scanned encrypted data package (action 224) and compares the package data to corresponding data found in the encrypted data package received by the passenger application from the SO-DTS (action 226) to determine if there is a match (action 228). If no match is found, the program ends. If, however, a match is found, the passenger application informs the passenger (action 230) via the passenger's mobile computing device (action 232). The passenger's mobile computing device notifies the passenger of the match (action 234) employing any appropriate notification method (including displaying a message, or playing a signal sound, or using speech, or producing a tactile event, or displaying the scene viewed by the "camera" of the device and highlighting the vehicle in some visual manner, or any combination of notification methods), and the passenger receives the notification (action 236).

It is noted that the pick-up location could be at an event where other people are also waiting for transportation. In such a case, the SO-DTS implementations described herein provide an additional advantage by assisting a passenger in identifying which vehicle of many possible vehicles picking up passengers is the one there to pick them up as only one of the vehicles should be displaying an encrypted data package that matches the encrypted data package received by the passenger from the SO-DTS.

In addition, as shown in FIG. 2, in one implementation, when a match is found, the passenger application sends (action 238), and the SO-DTS receives (action 240) a match message. This match message indicates that a match has occurred, thereby confirming that the vehicle has arrived at the pick-up location and that the passenger has found the vehicle. In general, match messages of this type advantageously allow the SO-DTS to monitor the progress of each on-demand transportation event, perform analytics on the data collected, and head-off any problems (e.g., a passenger being left without transportation for an unacceptable amount of time, and so on).

In some implementations, once the passenger application running on the passenger's mobile computing device has detected the aforementioned match and informed the passenger, one or more security measures are initiated to ensure the matched vehicle, or its driver, or both are authentic. This has the advantage of reassuring the passenger that an unscrupulous vehicle/driver has not copied the encrypted data package displayed by the legitimate vehicle and is impersonating the vehicle. The additional safety the foregoing feature provides has become an imperative given recent incidents reported in the news of passengers being abducted by assailants pretending to be ride-sharing service drivers.

Figure 3:
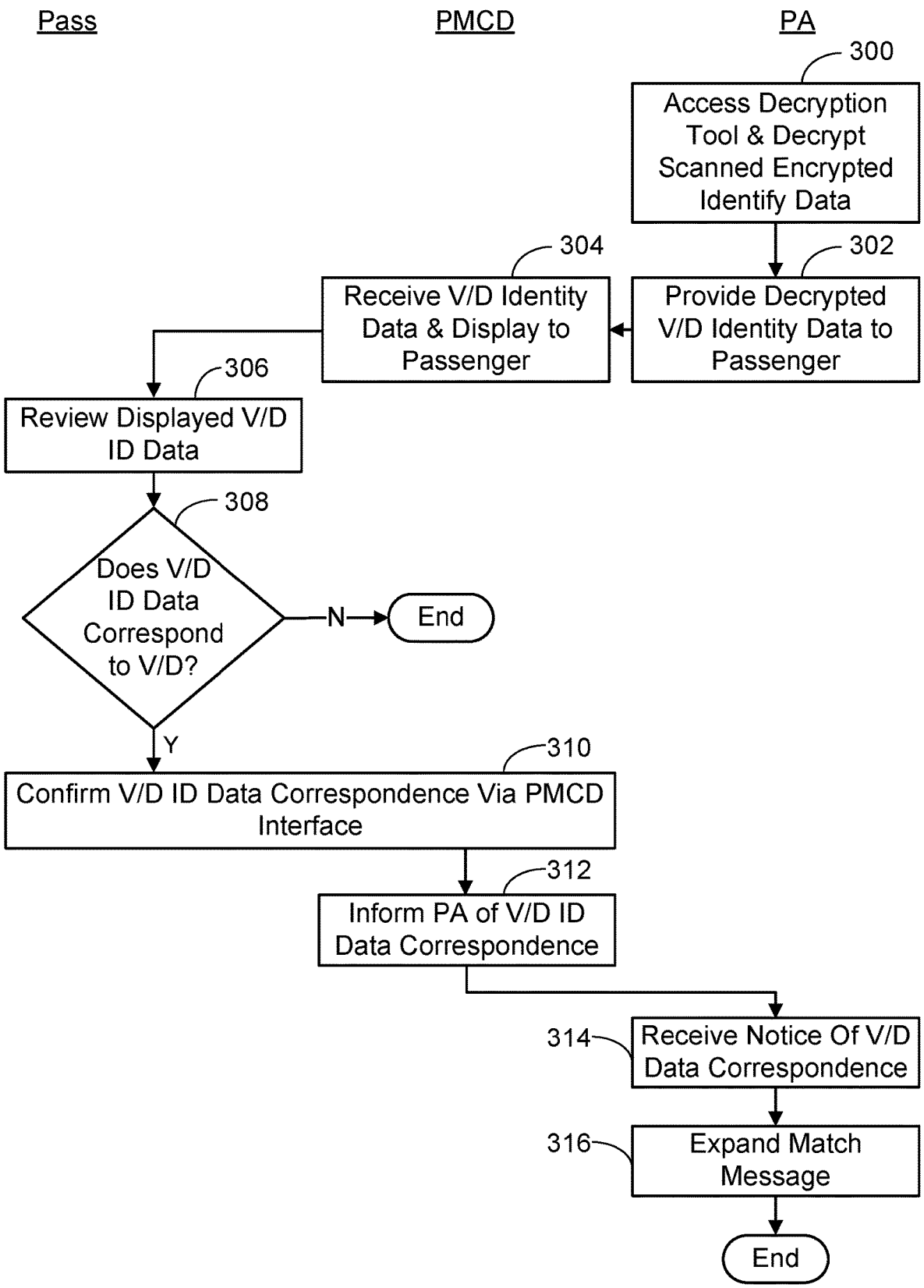
FIG. 3 is a flow diagram illustrating an exemplary implementation, in simplified form, of sub-programs for confirming the identity of the vehicle, or its driver, or both where the encrypted data package includes encrypted vehicle/driver identity data.

In one implementation, this added security is accomplished by having the displayed encrypted data package include encrypted identity data pertaining to the vehicle/driver's identity. It is assumed that the vehicle/driver identity information would have been provided to the SO-DTS ahead of time. For example, this information could be provided as part of the process of installing the vehicle/driver application on the vehicle/driver's mobile computing device. Referring to FIG. 3, the added security is accomplished as follows. The passenger application accesses a decryption tool and uses it to decrypt the scanned encrypted identity data (action 300). In one version, the SO-DTS provided the decryption tool to the passenger application along with the encrypted data package. The decrypted vehicle/driver's identity data is then provided to the passenger via the passenger's mobile computing device (action 302), for example using the device's display. In one version, the decrypted information includes an image of the vehicle, or the driver, or both. In another version, the decrypted information includes, in lieu of or in addition to an image, textual information such as the vehicle's license plate number and/or the driver's license number (and/or other identifying data).

The vehicle/driver's identity data is received by the passenger's mobile computing device and displayed to the passenger (action 304). The passenger reviews the displayed identity data (action 306) and then determines if the vehicle, or its driver, or both, correspond to the identity data (action 308). If the identify data is an image, the passenger would visually determine if the vehicle matches the vehicle image, and/or the driver is the person depicted in the driver image. If the identity data is textural, the passenger would compare the textural data (such as the vehicle license number) to the vehicle, and/or ask the driver to produce proof (such as their driver's license) showing a match to the textural data (such as the driver's license number). If the passenger personally determines the vehicle, or its driver, or both, correspond to the vehicle/driver identity data, then the passenger confirms the correspondence to the passenger application using an appropriate passenger's mobile computing device interface (action 310), such as via a touch screen, voice command, and so on. Next, the passenger application is informed of the confirmation (action 312). In one version, the aforementioned match message is expanded to include an indication that the vehicle, or its driver, or both, correspond to the vehicle/driver's identity data. More particularly, the passenger application receives notice of the vehicle/driver identity data correspondence (action 314), and the match message is expanded by the passenger application to confirm that the encrypted vehicle/driver identity data has been decrypted and provided to the passenger who has indicated via the passenger application that the vehicle, or its driver, or both, correspond to the decrypted identity data (action 316). However, if the passenger cannot confirm the vehicle/driver identity, then the passenger can refuse the ride and the program ends.

Figure 4A:
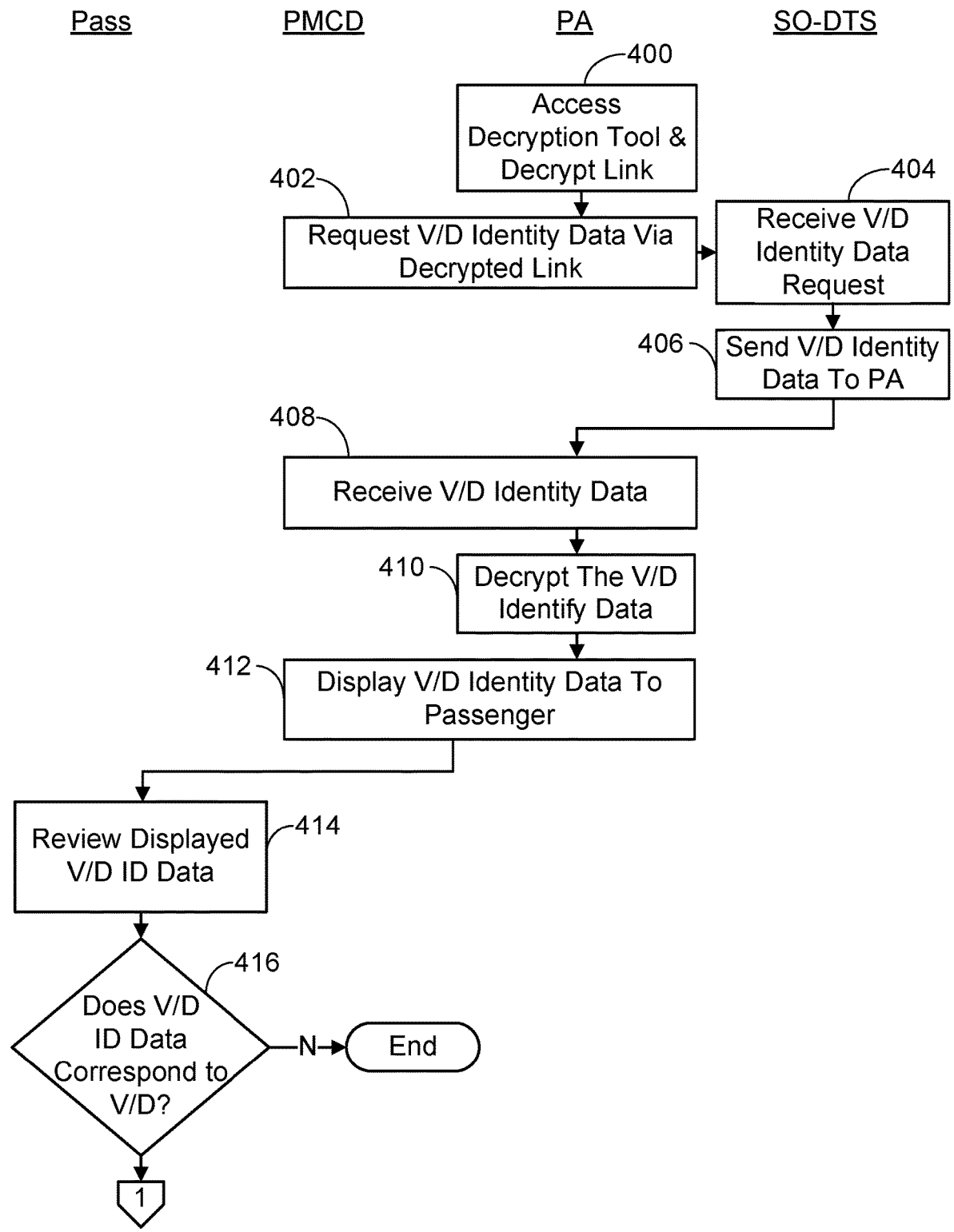
FIGS. 4A-B are a flow diagram illustrating an exemplary implementation, in simplified form, of sub-programs for confirming the identity of the vehicle, or its driver, or both where the encrypted data package includes an encrypted link to vehicle/driver identity data.
Figure 4B:
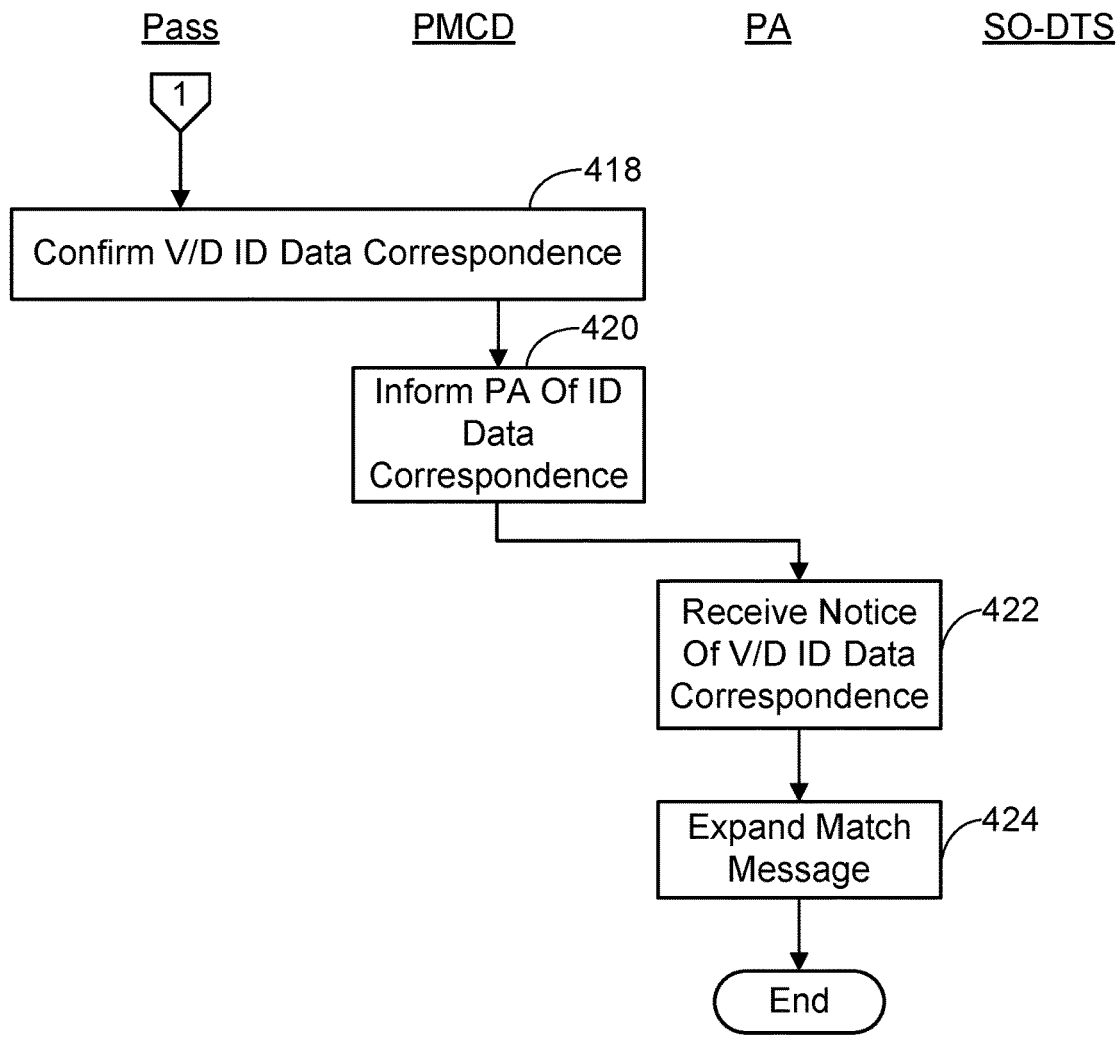

In one implementation, rather than including the encrypted identity data in the encrypted data package, an encrypted link to this data is included instead. Referring to FIGS. 4A-B, the aforementioned decryption tool would be accessed and used to decrypt the link (action 400). Once decrypted the passenger application uses the link to request the vehicle/driver's identity information from the SO-DTS via the passenger's mobile computing device (action 402). The SO-DTS receives the request (action 404) and sends the vehicle/driver identity data to the passenger application via the passenger's mobile computing device (action 406). The vehicle/driver's identity information is received by the passenger application via the passenger's mobile computing device (action 408). This data can be encrypted for added security. In one version, the aforementioned decryption tool is used to decrypt the vehicle/driver's identity information (action 410). The rest of the procedure is similar to that shown in FIG. 3. More particularly, the vehicle/driver's identity data is displayed to the passenger via the passenger's mobile computing device (action 412). The passenger reviews the displayed identity data (action 414) and determines if the vehicle, or its driver, or both, correspond (action 416). Next, the passenger confirms this correspondence to the passenger application via the passenger's mobile computing device (action 418), and the device informs the passenger application of the confirmation (action 420). In one version, the aforementioned match message is expanded to include an indication that the vehicle, or its driver, or both, correspond to the vehicle/driver's identity data. Thus, if the passenger personally determines the vehicle, or its driver, or both, correspond to the vehicle/driver identity data, then the passenger application receives notice of the correspondence (action 422), and the match message is expanded by the passenger application to confirm that the encrypted vehicle/driver identity data has been decrypted and provided to the passenger who has indicated via the passenger application that the vehicle, or its driver, or both, correspond to the decrypted identity data (action 424).

Figure 5:
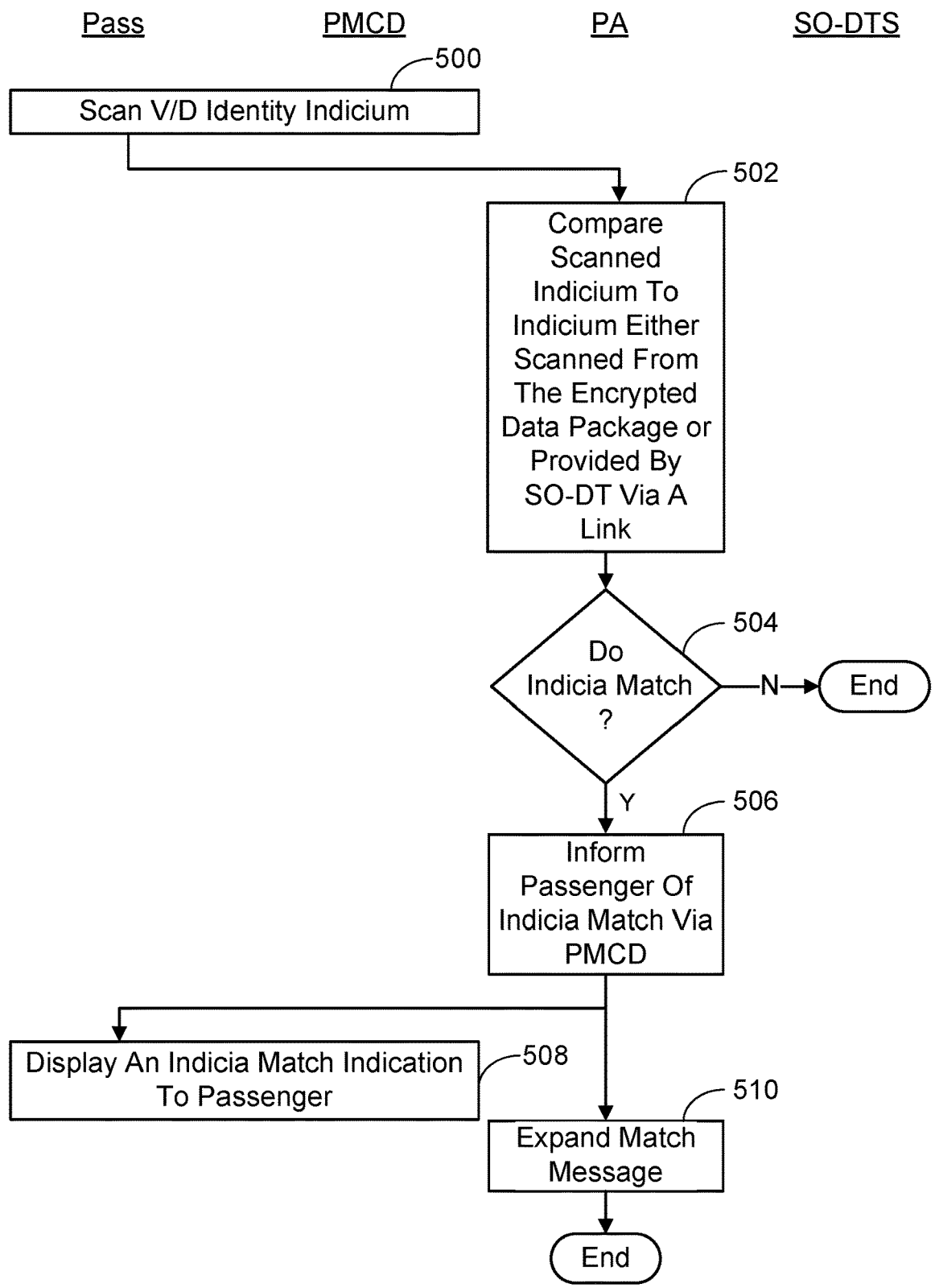
FIG. 5 is a flow diagram illustrating an exemplary implementation, in simplified form, of sub-programs for confirming the identity of the vehicle, or its driver, or both where the encrypted data package includes (either directly or through a link) vehicle/driver identity data in the form of a vehicle/driver identification indicium.

In one implementation, the procedure for confirming the vehicle/driver's identity data can be sped up and automated by employing a vehicle/driver identification indicium. In general, this indicium is an encoded non-human readable graphic that encodes data in graphical form, such as a bar code, QR code, and so on. In the context of vehicle/driver's identity, the vehicle/driver identification indicium graphically encodes the vehicle/driver's identity information provided by the SO-DTS to the passenger application. The vehicle/driver identification indicium is also displayed in the vehicle in a place not viewable from the outside (to prevent it from being easily copied) and/or the driver would present the vehicle/driver identification indicium in some form (e.g., displayed on the driver's mobile computing device or printed on a card, and so on) to the passenger. Referring to FIG. 5, the passenger scans the vehicle/driver identification indicium with their mobile computing device (action 500). The passenger application then compares the scanned indicium data to the vehicle/driver's identity information that was either scanned from the encrypted data package or provided by the SO-DTS via the aforementioned link (action 502). If the vehicle/driver's identity information encoded in the vehicle/driver identification indicium is encrypted for additional security, then the vehicle/driver's identity information is similarly encrypted in the encrypted data package, or if it was obtained via a decrypted link from the SO-DTS it would be in a similarly encrypted form. The advantage of encrypting the vehicle/driver's identity information and comparing it in its encrypted form is to protect any sensitive vehicle/driver information from public view (including the passenger). If the vehicle/driver's identity information encoded in the vehicle/driver identification indicium is unencrypted and the passenger application obtains this information for comparison from the encrypted data package, then the vehicle/driver identification information obtained from the encrypted data package is decrypted using the aforementioned decryption tool prior to being compared to the information scanned from the vehicle/driver identification indicium. If the vehicle/driver's identity information encoded in the vehicle/driver identification indicium is unencrypted and the passenger application obtains this information for comparison via a decrypted link from the SO-DTS, then either the vehicle/driver's identity information provided to the passenger by the SO-DTS is in unencrypted form, or the vehicle/driver's identity information provided to the passenger by the SO-DTS is encrypted and the decryption tool is employed by the passenger application to decrypt the information prior to it being compared to the scanned indicium data. It is next determined if the indicia match (action 504). If not, the passenger can refuse the ride and the program ends. If, however, a match is found, then the passenger application informs the passenger of such via the passenger's mobile computing device (action 506). To this end, in one version, the passenger's mobile computing device displays an indicia match indication to the passenger (action 508). For example, a text message confirming the indicia match could be displayed on the passenger's mobile computing device display screen. In addition, the passenger application expands the match message to confirm that the identity data has been scanned from the encrypted data package or received from the SO-DTS via a link, that the passenger has scanned the vehicle/driver identification indicium using the passenger's mobile computing device, that the scanned vehicle/driver identification indicium was compared by the passenger application to the identify data obtained via the encrypted data package to determine if they match, and that a match has been found (action 510).

The just-described vehicle/driver identity confirmation scenarios have a further advantage when the passenger and driver do not speak the same language (or when the vehicle is autonomous and the passenger cannot communicate with it directly). Since the confirmation involves using images, or text, or an indicium, no conversation is necessary. Thus, security and safety are achieved even if the passenger cannot talk with the vehicle or driver.

In some on-demand transportation scenarios it is also important for the vehicle/driver to confirm the identity of a passenger who presents themselves as being the person who requested transportation from the SO-DTS and was assigned to the vehicle/driver. This is advantageous not only for the vehicle/driver's security and safety, but also to ensure that the "legitimate" passenger is not left without transportation. The passenger identity information would have been provided to the SO-DTS ahead of time. For example, this information could be provided as part of the process of installing the passenger app on the passenger's mobile computing device. In some implementations, once a passenger has presented themselves to the vehicle/driver at the pick-up location, the vehicle application running on the vehicle/driver's mobile computing device is employed to initiate one or more security measures to ensure the passenger is the one who requested transportation from the SO-DTS and was assigned to the vehicle/driver.

Figure 6:
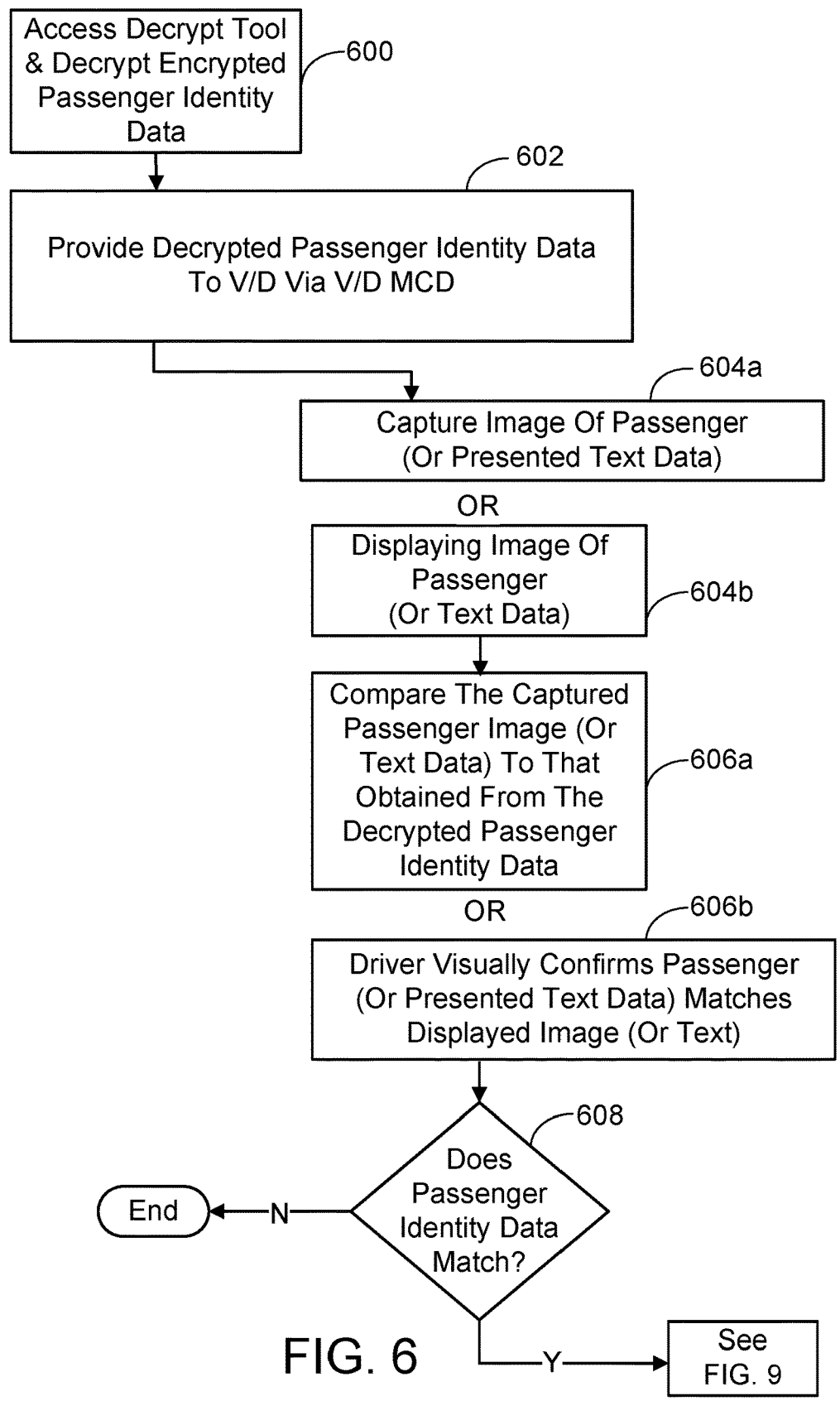
FIG. 6 is a flow diagram illustrating an exemplary implementation, in simplified form, of sub-programs for confirming the identity of the passenger where the encrypted data package includes encrypted passenger identity data.
Figure 9:
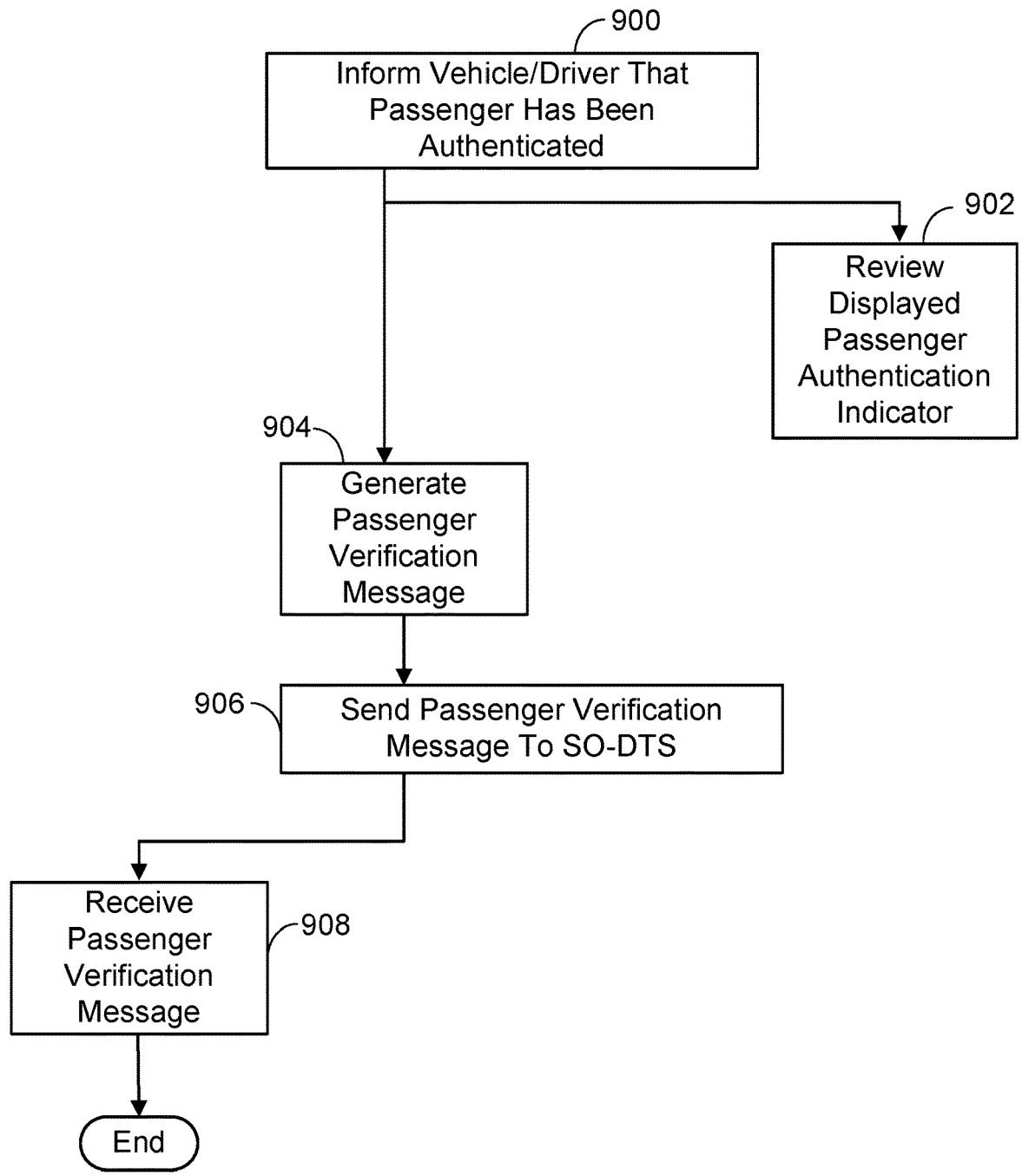
FIG. 9 is a flow diagram illustrating an exemplary implementation, in simplified form, of sub-programs for the vehicle/driver application to generate and send a passenger verification message to the SO-DTS.

In one implementation, the encrypted data package provided to the vehicle application includes encrypted passenger identity data pertaining to the identification of the passenger. Referring to FIG. 6, in this implementation, the vehicle application accesses a decryption tool and uses it to decrypt the encrypted passenger identity data (action 600). In one version, the SO-DTS provides the decryption tool to the vehicle application along with the encrypted data package. The decrypted passenger identity data is then provided to the vehicle/driver (action 602). In one version, the passenger identity data includes an image of the passenger, and/or other textual information such as the number associated with an "official" identification carried by the passenger (e.g., government-issued ID card, driver's license, passport, and so on). In the case of an image, in one version, an image of the passenger presenting themselves for transport would be captured by the vehicle/driver's mobile computing device (action 604*a*), and compared to the image obtained from the decrypted passenger information (action 606*a*). Alternately, if there is a driver, the decrypted image of the passenger can be displayed on the driver's mobile computing device (action 604*b*) and the driver would visually confirm that the passenger presenting themselves matches the image (action 606*b*) (and so is the passenger who requested transportation from the SO-DTS and was assigned to the vehicle/driver). In the case where the decrypted information included, textual information such as the number associated with an official identification carried by the passenger, the passenger would be required to present the identification so that it can be captured by the vehicle/driver mobile computing device (action 604*a*) and compared by the vehicle/driver application to the decrypted textual information (action 606*a*). Alternately, if there is a driver, the decrypted textual information of the passenger can be displayed on the driver's mobile computing device (action 604*b*) and the driver would visually confirm that the textual information presented by the passenger matches the information displayed on the driver's mobile computing device (action 606*b*). In either scenario, it is determined if the passenger identity data matches the passenger (action 608). If not, the program ends. If, however, a match is found, the sub-programs illustrated in FIG. 9 are followed as will be described in a paragraph to follow.

Figure 7:
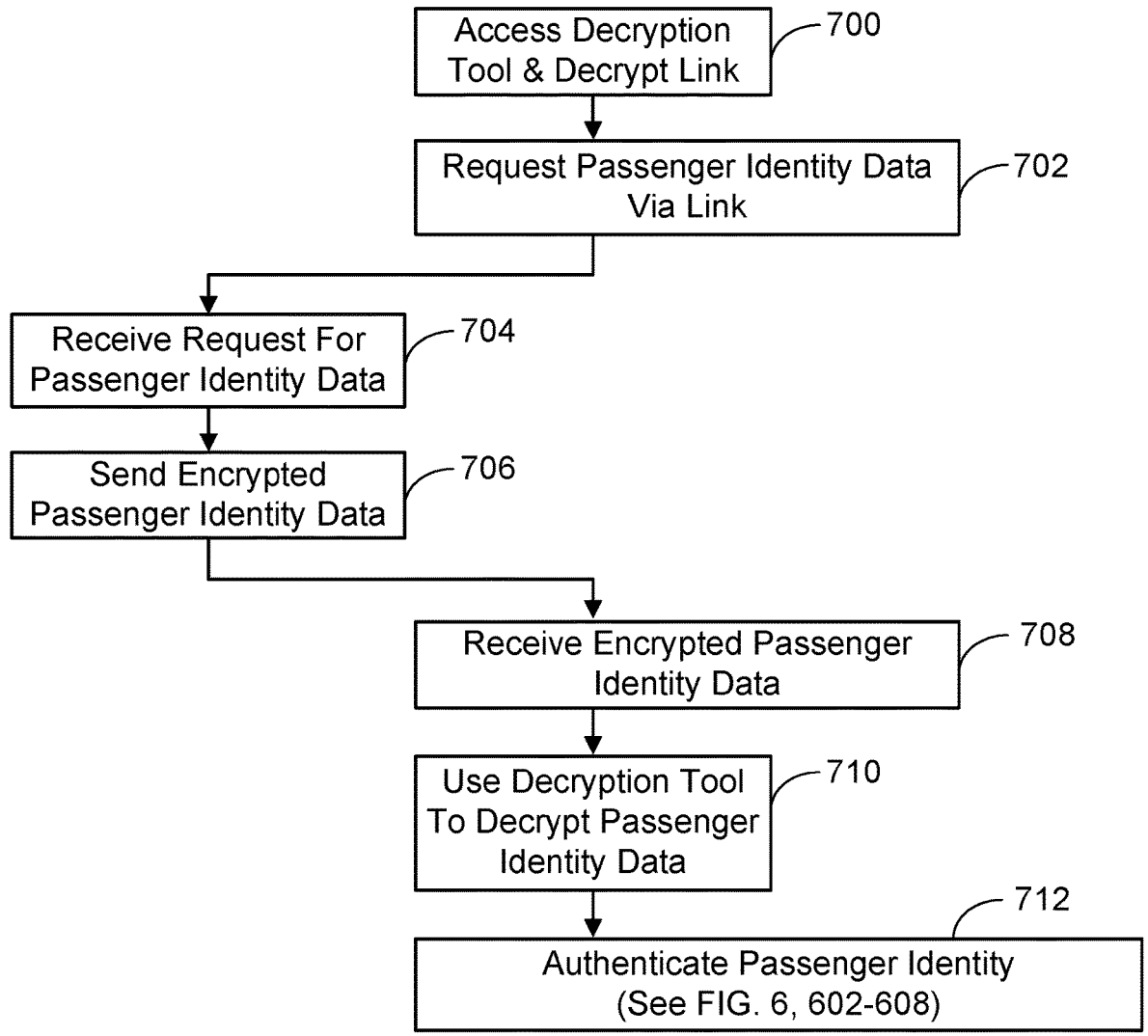
FIG. 7 is a flow diagram illustrating an exemplary implementation, in simplified form, of sub-programs for confirming the identity of the passenger where the encrypted data package includes an encrypted link to passenger identity data.
Figure 8:
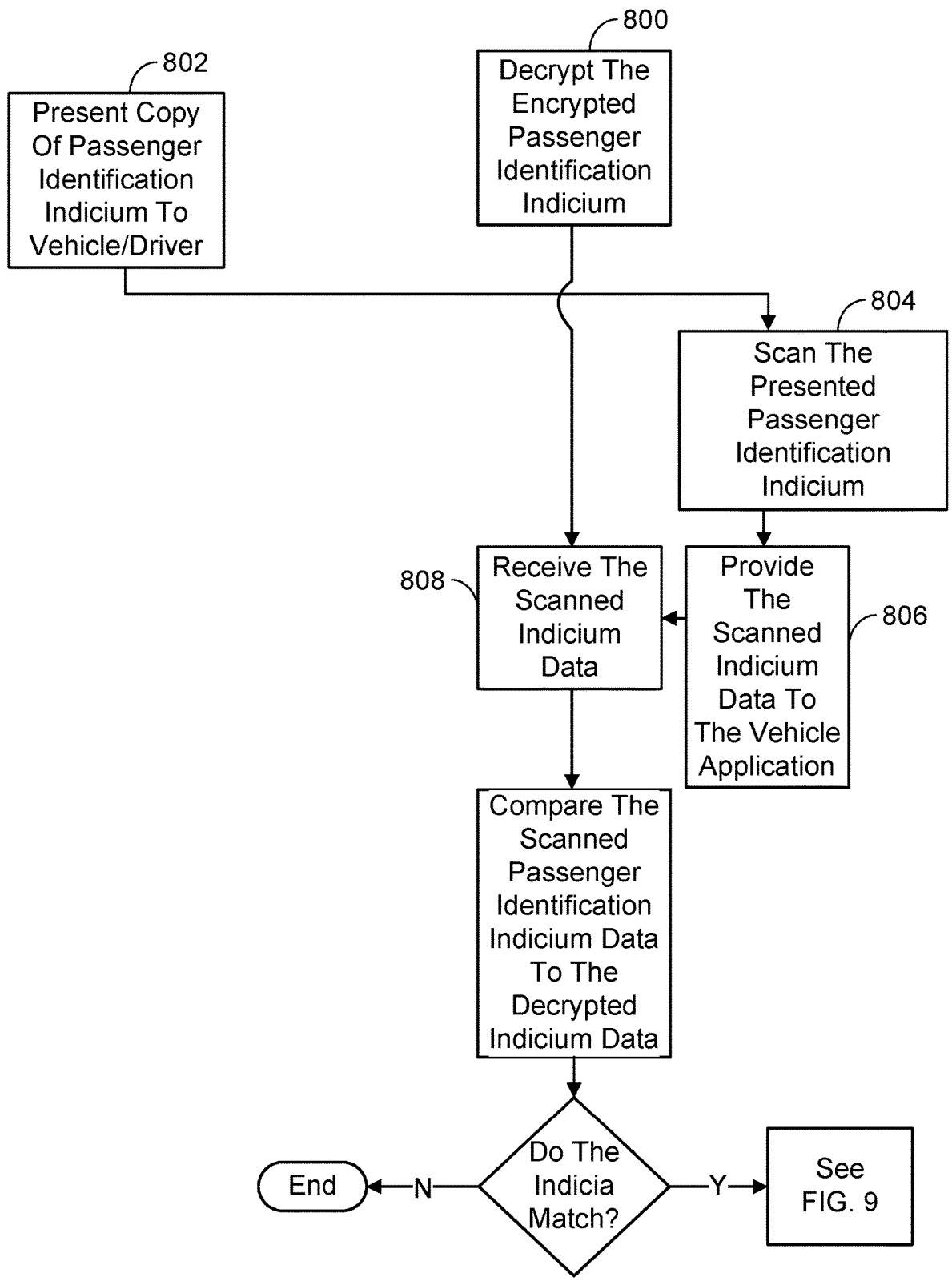
FIG. 8 is a flow diagram illustrating an exemplary implementation, in simplified form, of sub-programs for confirming the identity of the passenger where the encrypted data package includes (either directly or through a link) passenger identity data in the form of a passenger identification indicium.

In one implementation, rather than including the encrypted passenger identity data in the encrypted data package, an encrypted link to the SO-DTS where the aforementioned passenger identity data can be obtained is included instead. Referring to FIG. 7, in this implementation, the link is decrypted by the vehicle application using a previously-provided decryption tool in the manner described above (action 700), and the vehicle application requests the passenger identity information from the SO-DTS via the link (action 702). The SO-DTS receives the request (action 704), and in response sends the passenger identity data to the vehicle application in encrypted form (action 706). The vehicle application receives the encrypted passenger identity data (action 708) and uses the aforementioned decryption tool to decrypt the passenger identity data (action 710). This data is then used to authenticate the passenger in the manner described previously in FIG. 6, actions 602-608 (action 712). It is noted that the passenger identity data is provided from the SO-DTS in encrypted form as an added security measure.

In one implementation, the procedure for confirming the passenger's identity can be sped up and automated by employing a passenger identification indicium. Similar to the vehicle/driver identification indicium, this indicium is an encoded non-human readable graphic that encodes data in graphical form, such as a bar code, QR code, and so on. In the context of passenger's identity, the passenger identification indicium graphically encodes the passenger's identity information. The passenger identification indicium is encrypted, and in one version included in the encrypted data package provided by the SO-DTS to the vehicle application. Alternately, an encrypted link is included in the encrypted data package. This link is decrypted using a decryption tool also provided to the vehicle/driver, and used to obtain the encrypted passenger identification indicium from the SO-DTS. In either case, referring to FIG. 8, the vehicle application uses the decryption tool to decrypt the encrypted passenger identification indicium (action 800). The passenger is provided with an unencrypted copy of the passenger identification indicium (e.g., along with encrypted data package). The passenger presents a copy of the passenger identification indicium in some form (e.g., displayed on the passenger's mobile computing device) to the vehicle/driver (action 802). The vehicle/driver uses the vehicle/driver's mobile computing device to scan the presented passenger identification indicium (action 804), and the scanned data is provided to the vehicle application (action 806). The vehicle application then receives the scanned passenger identification indicium (action 808) and compares it to the passenger identification indicium that was either scanned from the encrypted data package or provided by the SO-DTS via the aforementioned link (action 810). It is then determined if the compared passenger identity indicia match (action 812). If not, the program ends. If, however, a match is found, the sub-programs illustrated in FIG. 9 are followed as will now be described.

Once it is confirmed that the passenger is authentic by any of the foregoing programs, the vehicle/driver is informed (if necessary) via their mobile computing device that the passenger presenting themselves is the passenger who requested transportation from the SO-DTS and was assigned to the vehicle/driver (action 900). For example, but without limitation, an authentic passenger indicator can be displayed on the vehicle/driver's mobile computing device screen and reviewed by the vehicle/driver (action 902). Additionally, in some implementations, a passenger verification message is generated by the vehicle application (action 904) and sent via the vehicle/driver mobile computing device (action 906) to the SO-DTS (action 908). This passenger verification message indicates that the passenger who presented themselves for transportation is the person who requested it and was assigned to the vehicle. In one version, this is accomplished by including a confirmation in the passenger verification message that the passenger has presented identification to the vehicle/driver, and that the vehicle/driver has scanned and verified the identification presented by the passenger (including comparing the scanned indicium to a decrypted version of the passenger identification indicium found in the encrypted data package or obtained via a link found in the encrypted data package if indicia are employed) to determine if the indicia match, and that a match has been found.

The just-described passenger identity confirmation scenarios have a further advantage when the passenger and driver do not speak the same language (or when the vehicle is autonomous and the passenger cannot communicate with it directly). Since the confirmation involves using images, or text, or an indicium, no conversation is necessary. Thus, security and safety are achieved even if the vehicle or driver cannot speak with the passenger.

Figure 10A:
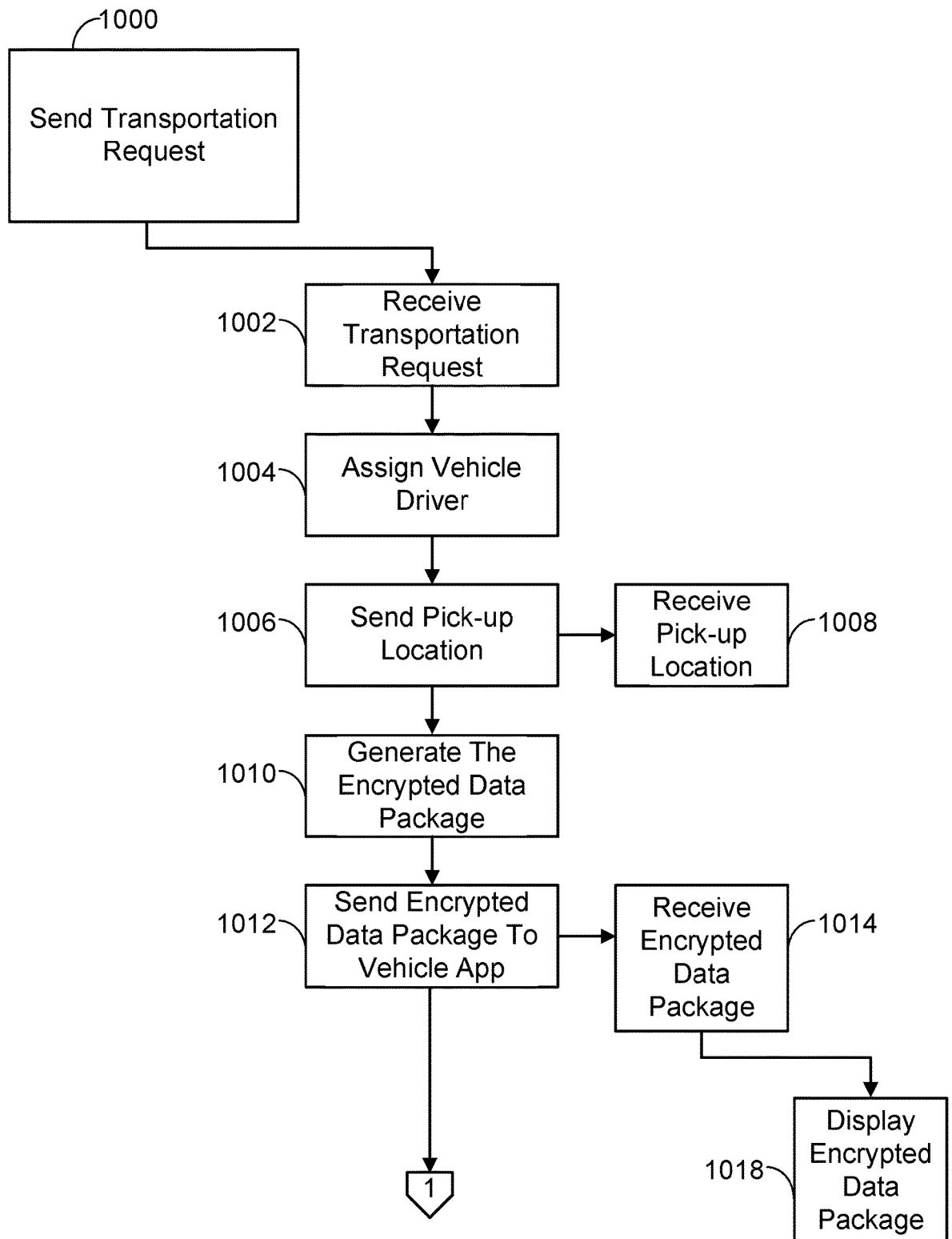
FIGS. 10A-C are a flow diagram illustrating an exemplary implementation, in simplified form, of sub-programs for providing on-demand transportation to a passenger where the encrypted data package is sent to the vehicle application running on the vehicle/driver's mobile computing device and a security data package is sent to the passenger application running on the passenger's mobile computing device.
Figure 10B:
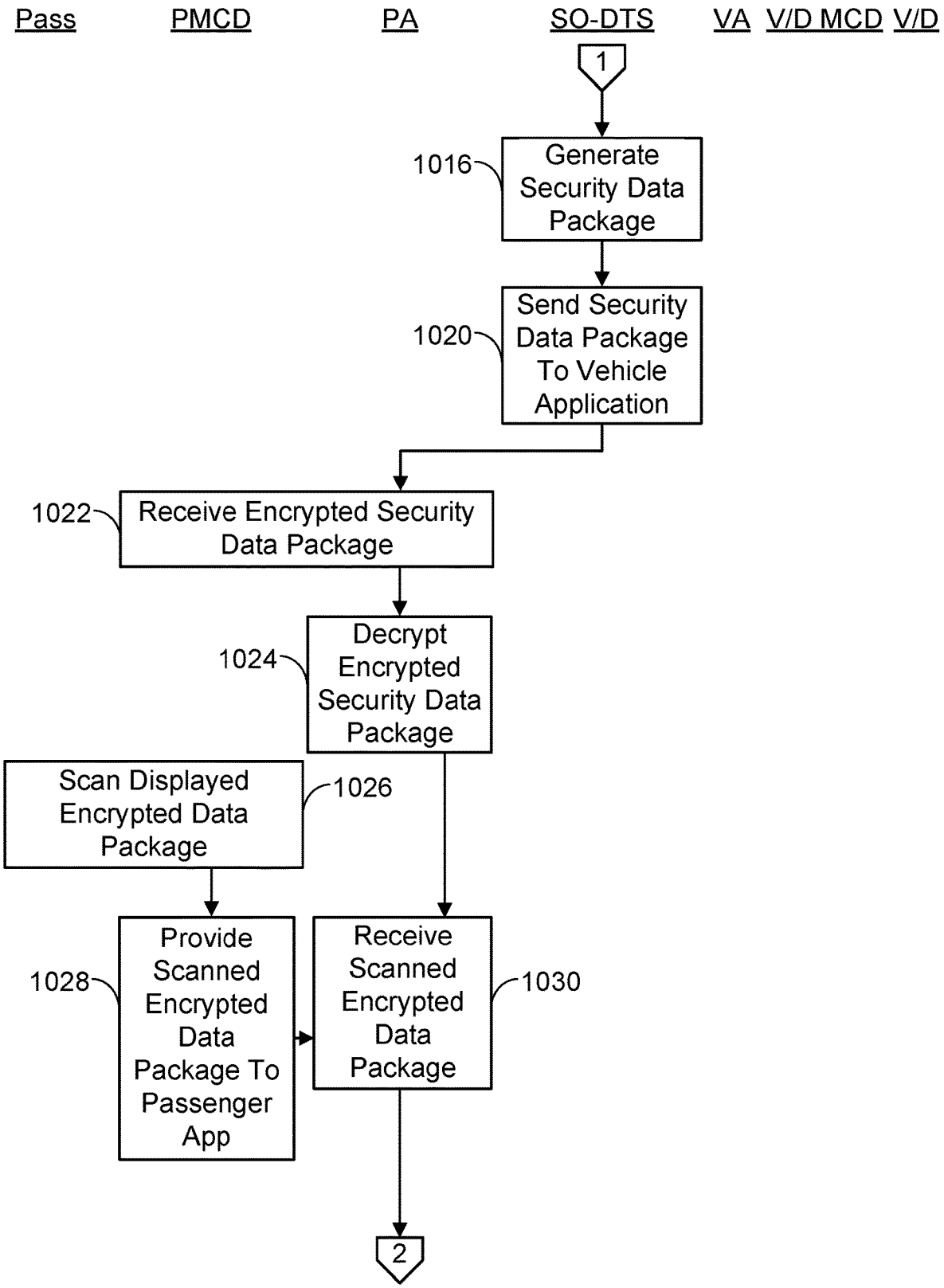
Figure 10C:
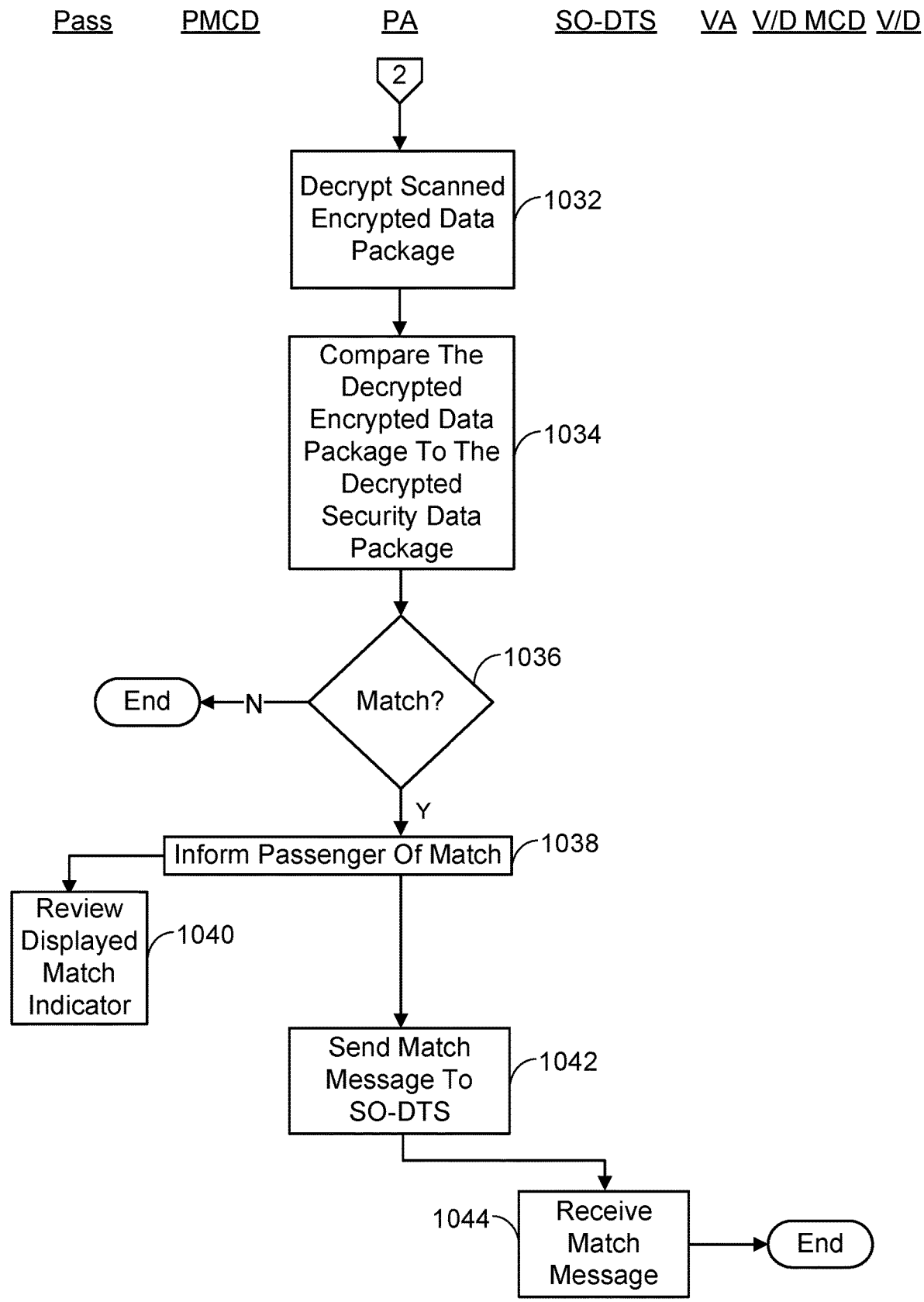

In one alternate implementation, the SO-DTS provides the encrypted data package to just the vehicle application. Referring to FIGS. 10A-C, the passenger sends a transportation request to the SO-DTS via the passenger's mobile computing device using the passenger application (action 1000). The SO-DTS receives the request (action 1002), assigns a vehicle/driver (action 1004) and sends the pick-up location to the vehicle application via the vehicle/driver mobile computing device (action 1006). The SO-DTS also generates the encrypted data package (action 1010) and sends it to the vehicle application via the vehicle/driver mobile computing device (1012). The vehicle application receives the pick-up location (action 1008) and the encrypted data package (action 1014) via the vehicle/driver mobile computing device. The encrypted data package is displayed via the externally visible display associated with the vehicle at the pick-up location when the vehicle arrives (action 1018). The SO-DTS also generates a security data package (action 1016) that includes the data found in the encrypted data package and provides it to the passenger application via the passenger's mobile computing device (action 1020). The data in the security data package can be encrypted to enhance its security, or in unencrypted form (thus relying on the inherent security of it being sent via the previously described secure communication channel). If it is encrypted (as assumed in FIGS. 10A-C), the passenger application receives the encrypted security data package via the passenger's mobile computing device (action 1022) and decrypts it using a decryption tool previously provided by the SO-DTS (action 1024).

The passenger scans the displayed encrypted data package using the their mobile computing device (action 1026). The scanned encrypted data package is provided to (action 1028) and received by (action 1030) the passenger application. The passenger application decrypts the scanned data using the decryption tool previously provided by the SO-DTS (action 1032), and compares the scanned package data to corresponding data found in the security data package (action 1034) to determine if there is a match (action 1036). If no match is found, the passenger can refuse the ride and the procedure ends. If, however, a match is found, the passenger application informs (action 1038) the passenger via the passenger's mobile computing device using any appropriate method as described previously. For example, but without limitation, a match indicator can be displayed on the passenger's mobile computing device for the passenger to review (action 1040). In addition, in one implementation when a match is found, the passenger application sends (action 1042), and the SO-DTS receives (action 1044) a match message. This match message indicates that a match has occurred thereby confirming that the vehicle has arrived at the pick-up location and that the passenger has found the vehicle.

In some implementations, once the passenger application running on the passenger's mobile computing device has detected the aforementioned match and informed the passenger, one or more security measures are initiated to ensure the matched vehicle, or its driver, or both are authentic. This has the advantage of reassuring the passenger that an unscrupulous vehicle/driver has not copied the encrypted data package displayed by the legitimate vehicle and is impersonating the vehicle.

Figure 11:
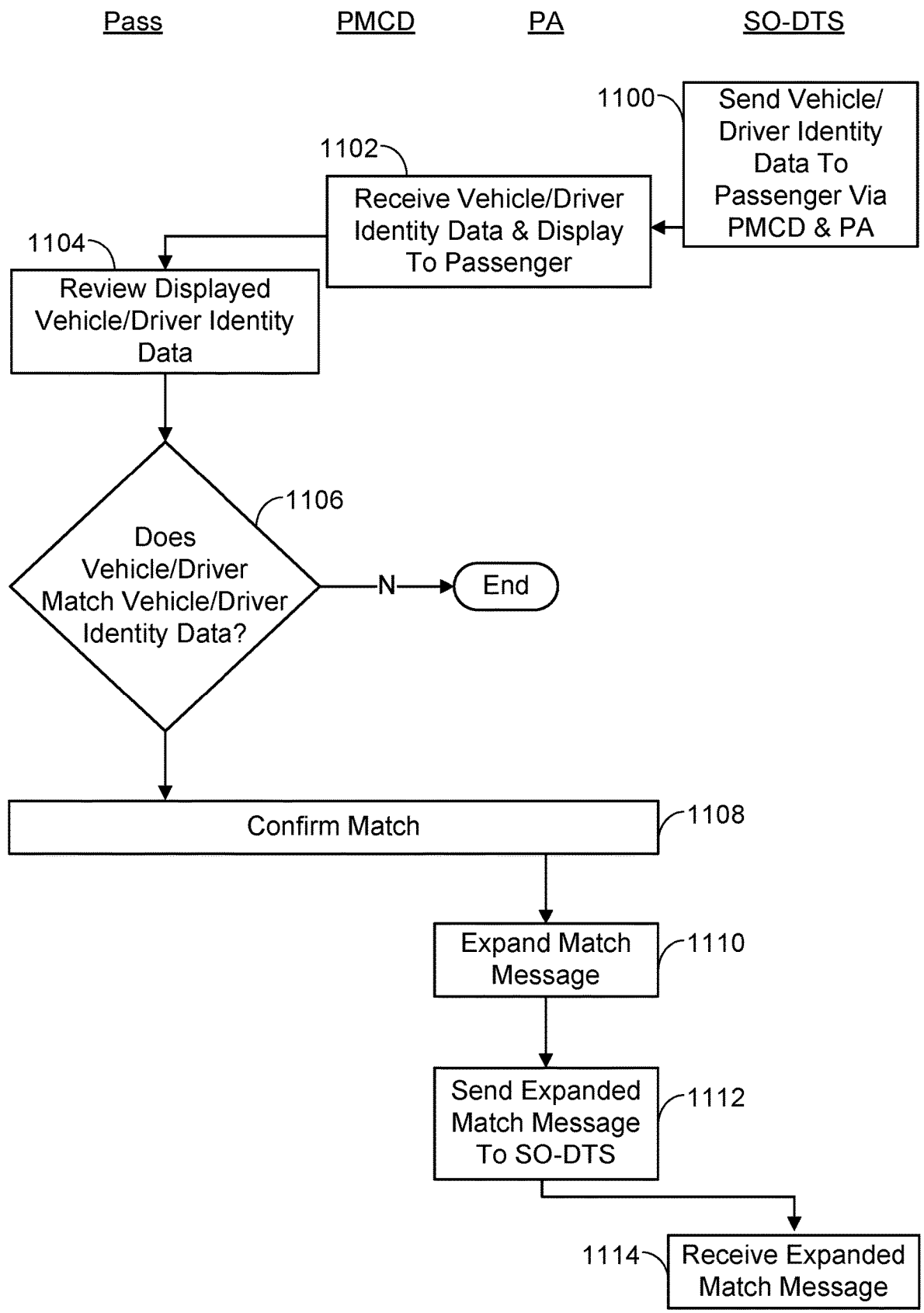
FIG. 11 is a flow diagram illustrating an exemplary implementation, in simplified form, of sub-programs for confirming the identity of the vehicle, or its driver, or both where the security data package includes encrypted vehicle/driver identity data.

In one implementation, this added security is accomplished by having the security data package provided to the passenger application include identity data pertaining to the vehicle/driver's identity. Referring to FIG. 11, the SO-DTS sends the vehicle/driver's identity information (action 1100) to the passenger via the passenger's mobile computing device (action 1102) using, for example, the device's display. As in previously-described implementations, the information can include an image of the vehicle, or the driver, or both. In another version, the information includes, in lieu of or in addition to an image, textual information such as the vehicle's license plate number and/or the driver's license number (and/or other identifying data).

Once the vehicle/driver's identity data has been provided, the passenger reviews it (action 1104) such as for example viewing it on the passenger's mobile computing device display, and then determines if the vehicle, or its driver, or both, correspond to the identity data (action 1106). If the identify data is an image, the passenger would visually determine if the vehicle matches the vehicle image, and/or the driver is the person depicted in the driver image. If the identity data is textual, the passenger would compare the textural data (such as the vehicle license number) to the vehicle, and/or ask the driver to produce proof (such as their driver's license) showing a match to the textural data (such as the driver's license number). If the vehicle/driver identity data does not match, the passenger can refuse the ride and the program ends. If, however, the vehicle/driver identity data does corresponds to the vehicle/driver, then the passenger confirms the match using the passenger's mobile computing device and passenger application (action 1108), using an appropriate user interface.

In one implementation, the procedure for confirming the vehicle/driver's identity data can be sped up and automated by employing a vehicle/driver identification indicium (similar to previously-described implementations). In the context of vehicle/driver's identity, the vehicle/driver identification indicium graphically encodes the vehicle/driver's identity information. A copy of the vehicle/driver identification indicium is provided to the passenger application by the SO-DTS ahead of time (e.g., when the security data package is sent). In one version, the vehicle/driver identification indicium received by the passenger application is encrypted to enhance security. If so, the passenger application uses a decryption tool previously provided by the SO-DTS to decrypt the indicium.

Figure 12:
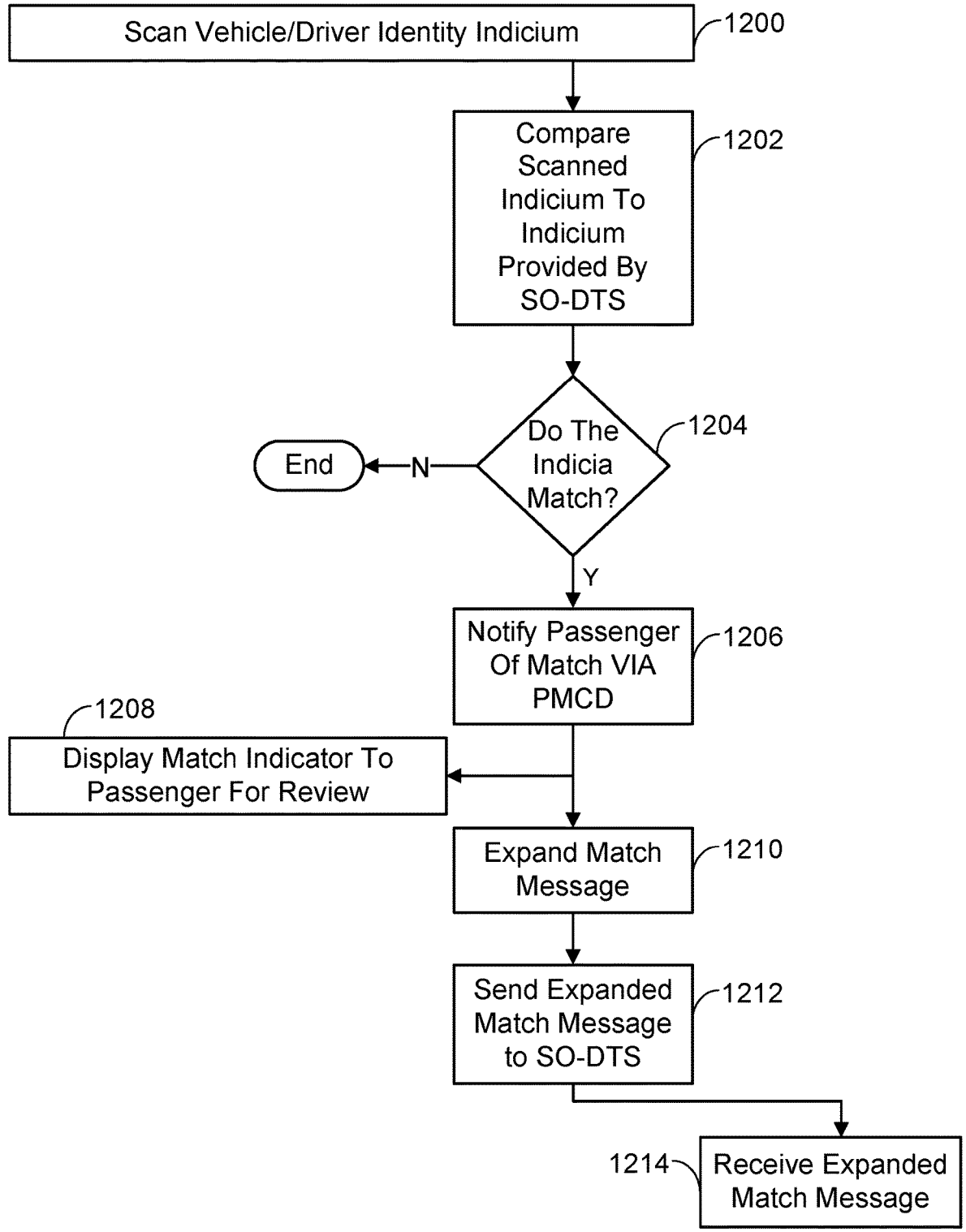
FIG. 12 is a flow diagram illustrating an exemplary implementation, in simplified form, of sub-programs for confirming the identity of the vehicle, or its driver, or both where the security data package includes vehicle/driver identity data in the form of a vehicle/driver identification indicium.

The vehicle/driver identification indicium is also displayed in the vehicle in a place not viewable from the outside (to prevent it from being easily copied) and/or the driver would present the vehicle/driver identification indicium in some form (e.g., displayed on the driver's mobile computing device or printed on a card, and so on) to the passenger. Referring to FIG. 12, the passenger scans the vehicle/driver identification indicium with their mobile computing device which then provides it to the passenger application (action 1200). The passenger application compares the scanned indicium data to the indicium provided by the SO-DTS (action 1202) to determine if there is a match (action 1204). If no match is found, the passenger can refuse the ride and the procedure ends. If, however, a match is found, the passenger is notified via their mobile computing device (action 1206). For example, but without limitation, a match indicator could be displayed on the passenger's mobile computing device display screen (action 1208). The passenger can then accept the ride.

In some implementations, the aforementioned match message is expanded to include an indication that the vehicle, or its driver, or both, correspond to the vehicle/driver's identity data which was either provided by the SO-DTS in human readable form or encoded in the vehicle/driver identification indicium. If the passenger personally determines whether the vehicle, or its driver, or both, correspond to the vehicle/driver identity data, then referring again to FIG. 11, the passenger application expands the match message (action 1110) to confirm that the passenger has indicated via the passenger application that the vehicle, or its driver, or both, correspond to the identity data. If the previously-described vehicle/driver identification indicium scheme is employed, then referring again to FIG. 12, the passenger application expands the match message (action 1210) to confirm that the passenger has scanned the vehicle/driver identification indicium from the vehicle or driver using the passenger's mobile computing device, that the scanned vehicle/driver identification indicium was compared by the passenger application to the vehicle/driver identification indicium received from the SO-DTS to determine if they match, and that a match has been found. In either of the foregoing scenarios, the expanded match message is sent to the SO-DTS, which receives it for further processing (see 1112, 1114 in FIGS. 11 and 1212, 1214 in FIG. 12).

As described previously, in some on-demand transportation scenarios it is important for the vehicle/driver to confirm the identity of a passenger who presents themselves as being the person who requested transportation from the SO-DTS and was assigned to the vehicle/driver. The passenger identity information would have been provided to the SO-DTS ahead of time. In some implementations, once a passenger has presented themselves to the vehicle/driver at the pick-up location, the vehicle application running on the vehicle/driver's mobile computing device is employed to initiate one or more security measures to ensure the passenger is the one who requested transportation from the SO-DTS and was assigned to the vehicle/driver. These security measures are generally the same as described previously with reference to FIGS. 6-9, with the exception that, in one implementation, the SO-DTS provides the passenger with an unencrypted copy of the passenger identity indicium along with the security data package, rather than with the encrypted data package.

The SO-DTS implementations described so far are "cloud-centric" in nature as most of the computations (e.g., generating the encrypted data package and so on) are performed on the one or more computing devices associated with the secure on-demand transportation service via a secure on-demand transportation computer program. When multiple computing devices are involved (as is usually the case), these computing devices can communicate with each other via the network. In an exemplary implementation of the SO-DTS implementations described herein, the computing devices are located in the "cloud" so that the service operates as a cloud service and the network includes wide area network functionality. The term "cloud service" is used herein to refer to a web application that operates in the cloud and can be hosted on (e.g., deployed at) a plurality of data centers that can be located in different geographic regions (e.g., different regions of the world).

Figure 13A:
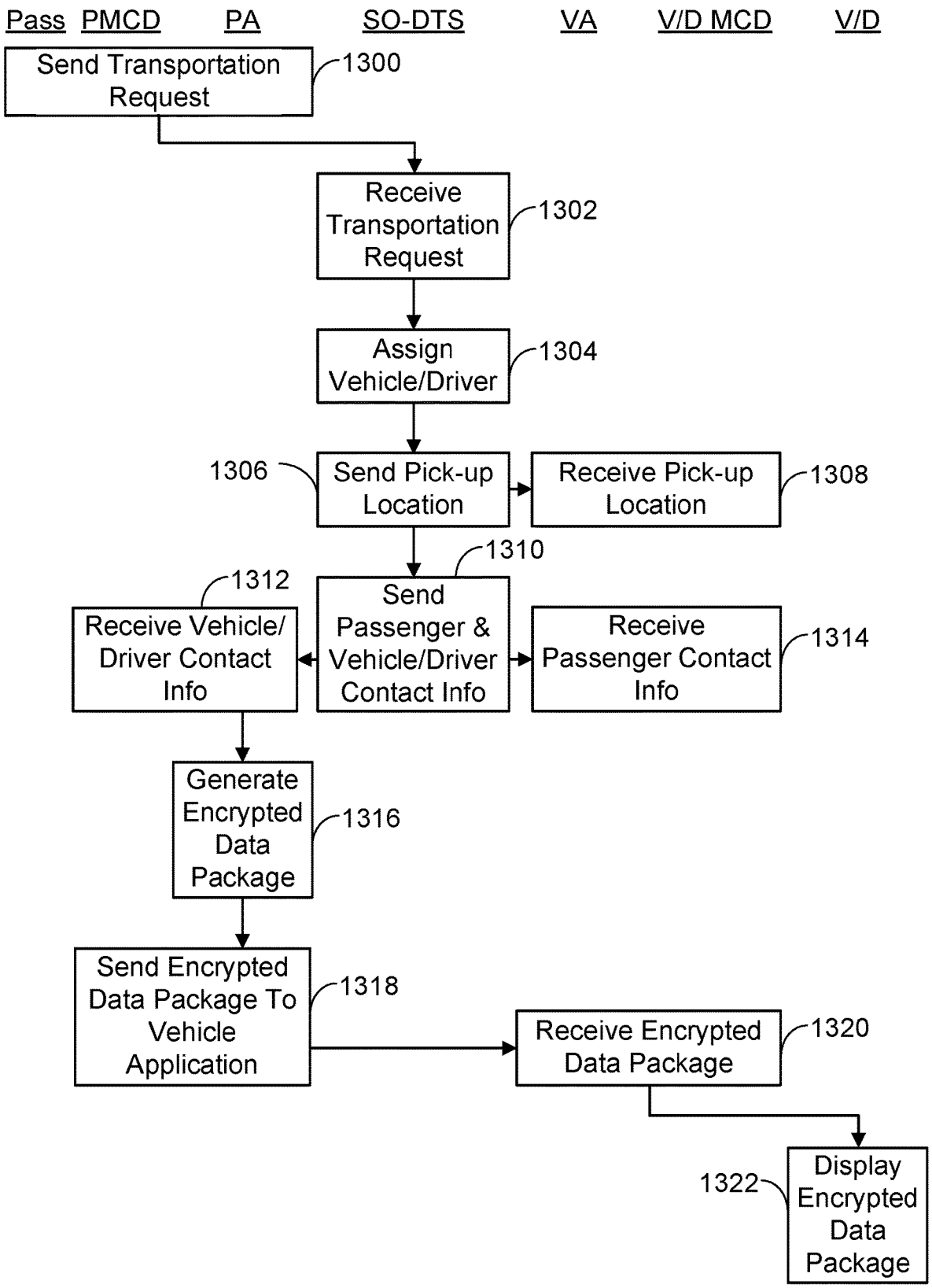
FIGS. 13A-B are a flow diagram illustrating an exemplary implementation, in simplified form, of sub-programs for providing on-demand transportation to a passenger where the encrypted data package is generated by the passenger application running on the passenger's mobile computing device and sent to the to the vehicle application running on the vehicle/driver's mobile computing device.
Figure 13B:
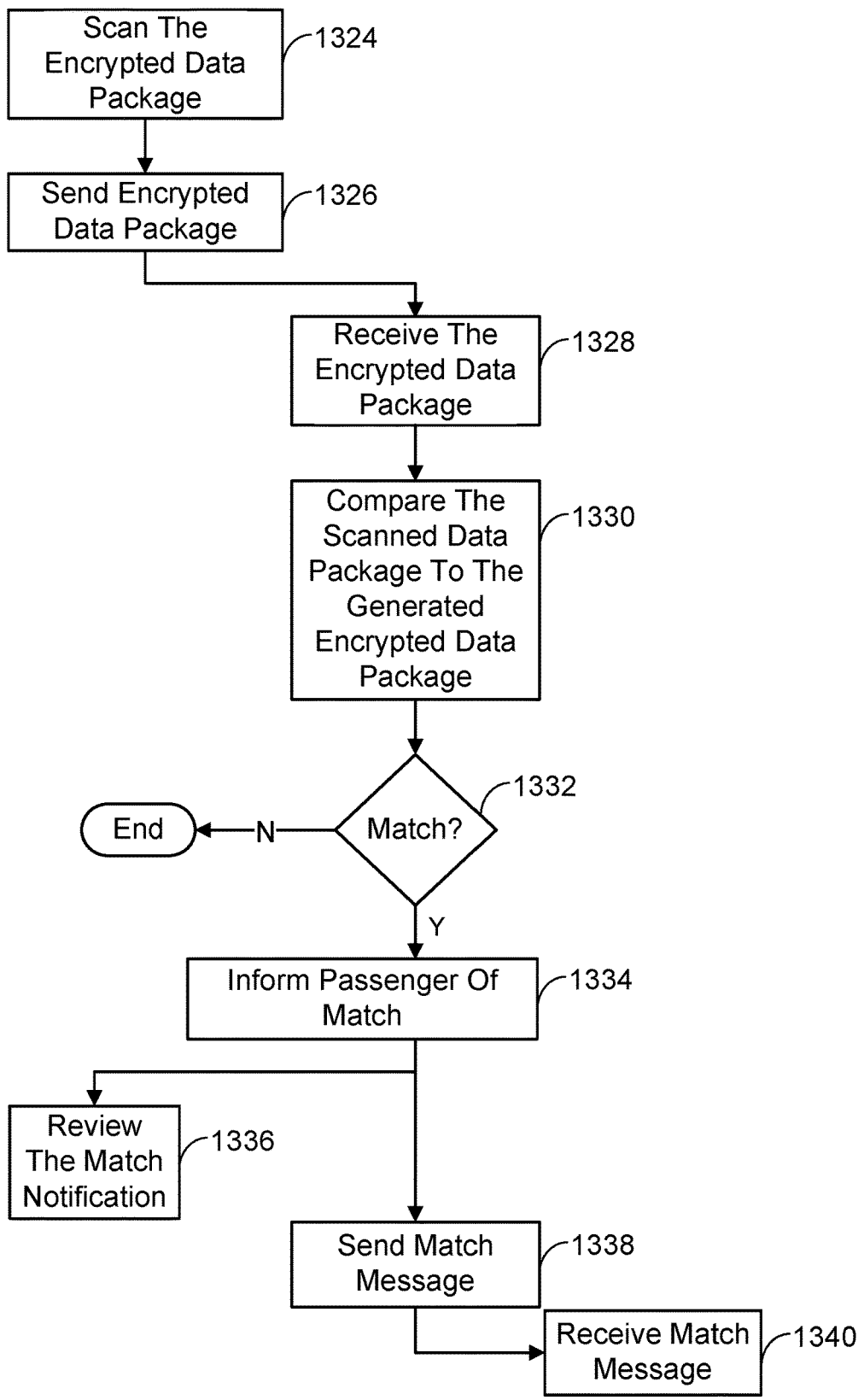

However, some implementations are "passenger application-centric" in nature in that most of the computations are performed on the passenger's mobile computing device via the passenger application. In these implementations, the SO-DTS takes on a smaller role, but still provides the applications and data needed to conduct the on-demand transportation operations. In addition, the SO-DTS can still monitor and analyze the operations via the match messages. Referring to FIGS. 13A-B, in these passenger application-centric implementations, the passenger application still sends (action 1300) and the SO-DTS still receives (action 1302) a transportation request. This request, among other things, specifies the pick-up location. In response, the SO-DTS assigns a vehicle to provide the requested transportation (action 1304). The assigned vehicle, or its driver, or both are then contacted by the SO-DTS via the vehicle application running on the mobile computing device associated with the vehicle/driver. The SO-DTS sends (action 1306) and the vehicle application receives (action 1308), among other things, the specified pick-up location to a vehicle application as with previously-described implementations. It also sends (action 1310) contact information to the passenger and vehicle applications (actions 1312, 1314) so that these applications can contact each other via their respective mobile computing devices.

In one passenger application-centric implementation, it is the passenger application (rather than the SO-DTS) that generates the previously-described encrypted data package (action 1316). Any information that the passenger application needs from the SO-DTS to generate the encrypted data package (such as data identifying the current transportation request and proprietary information that is unique to, and identifies, the particular SO-DTS) is provided along with the aforementioned vehicle/driver contact information. In addition, the passenger application has the necessary encryption tool on board to encrypt the data package.

The passenger application sends the encrypted data package from the passenger's mobile computing device (action 1318) to the vehicle application running on a mobile computing device associated with the assigned vehicle, or a driver of the vehicle, or both (action 1320).

The encrypted data package is displayed via the externally visible display associated with the vehicle at the pick-up location when the vehicle arrives (action 1322). The passenger scans the displayed encrypted data package using their mobile computing device (action 1324) and provides it to the passenger application (action 1326). The passenger application obtains (action 1328) and compares the scanned package data to corresponding data found in the encrypted data package generated by the passenger application (action 1330) to determine if there is a match (action 1332). If no match is found, then the passenger can refuse the ride and the procedure ends. If, however, a match is found, the passenger application informs the passenger via the passenger's mobile computing device (action 1334) and the passenger reviews the notification (action 1336) via an appropriate user interface of the passenger's mobile computing device (such as being displayed on a screen, and so on).

In addition, in one implementation when a match is found, the passenger application sends (action 1338), and the SO-DTS receives (action 1340) a match message. This match message indicates that a match has occurred thereby confirming that the vehicle has arrived at the pick-up location and that the passenger has found the vehicle.

In some passenger application-centric implementations, once the passenger application running on the passenger's mobile computing device has detected the aforementioned match and informed the passenger, one or more security measures are initiated to ensure the matched vehicle, or its driver, or both are authentic. As described previously, this has the advantage of reassuring the passenger that an unscrupulous vehicle/driver has not copied the encrypted data package displayed by the legitimate vehicle and is impersonating the vehicle.

Figure 14:
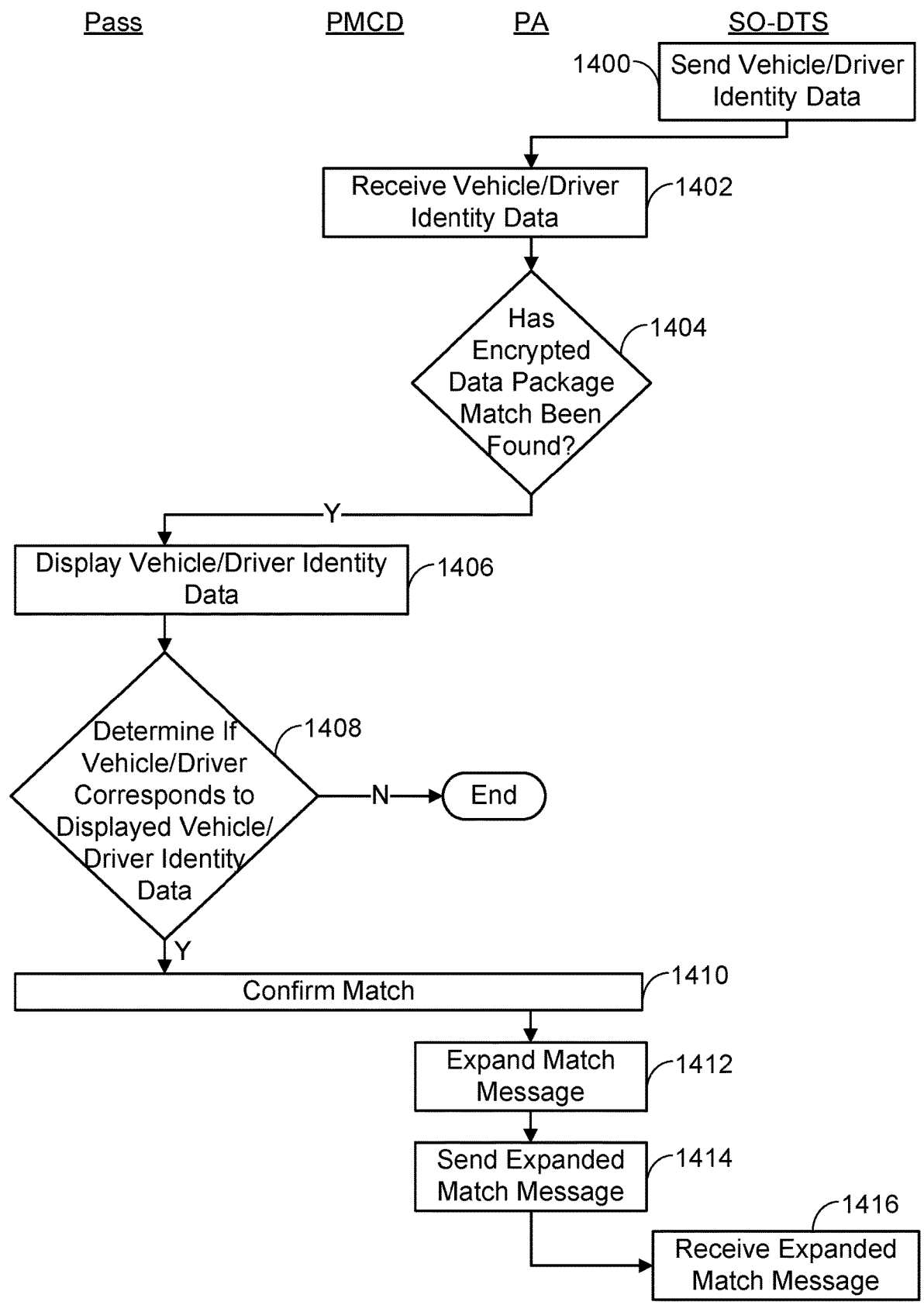
FIG. 14 is a flow diagram illustrating an exemplary implementation, in simplified form, of sub-programs for confirming the identity of the vehicle, or its driver, or both where the SO-DTS sends vehicle/driver identity data to the passenger application running on the passenger's mobile computing device.

In one implementation, this added security is accomplished as follows. Referring to FIG. 14, the SO-DTS sends the passenger application identity data pertaining to the vehicle/driver's identity (action 1400) via the passenger's mobile computing device (action 1402). For example, this vehicle/driver identity information can be provided along with the vehicle/driver contact information. In an alternate implementation (not shown in FIG. 14), the vehicle/driver identity information is provided to the passenger application by the vehicle application in response to the vehicle application receiving the passenger application's contact information from the SO-DTS. In either case, when an encrypted data package match is found (action 1404), the vehicle/driver's identity information is displayed to the passenger (e.g., via the passenger's mobile computing device display) (action 1406). As in previously-described implementations, the information can include an image of the vehicle, or the driver, or both. In another version, the information includes, in lieu of or in addition to an image, textual information such as the vehicle's license plate number and/or the driver's license number (and/or other identifying data).

Once the vehicle/driver's identity data has been provided, the passenger determines if the vehicle, or its driver, or both, correspond to the identity data (action 1408). If not, the passenger can refuse the ride and the procedure ends. If, however, correspondence is found, the passenger confirms the match using the passenger's mobile computing device and the passenger application via any appropriate user interface (action 1410). If the identify data is an image, the passenger would visually determine if the vehicle matches the vehicle image, and/or the driver is the person depicted in the driver image. If the identity data is textual, the passenger would compare the textual data (such as the vehicle license number) to the vehicle, and/or ask the driver to produce proof (such as their driver's license) showing a match to the textual data (such as the driver's license number).

In one implementation, the procedure for confirming the vehicle/driver's identity data can be sped up and automated by employing a vehicle/driver identification indicium (similar to previously-described implementations). In the context of vehicle/driver's identity, the vehicle/driver identification indicium graphically encodes the vehicle/driver's identity information. In this implementation, the vehicle/driver's identity data received from the SO-DTS takes the form of the vehicle/driver identification indicium.

Figure 15:
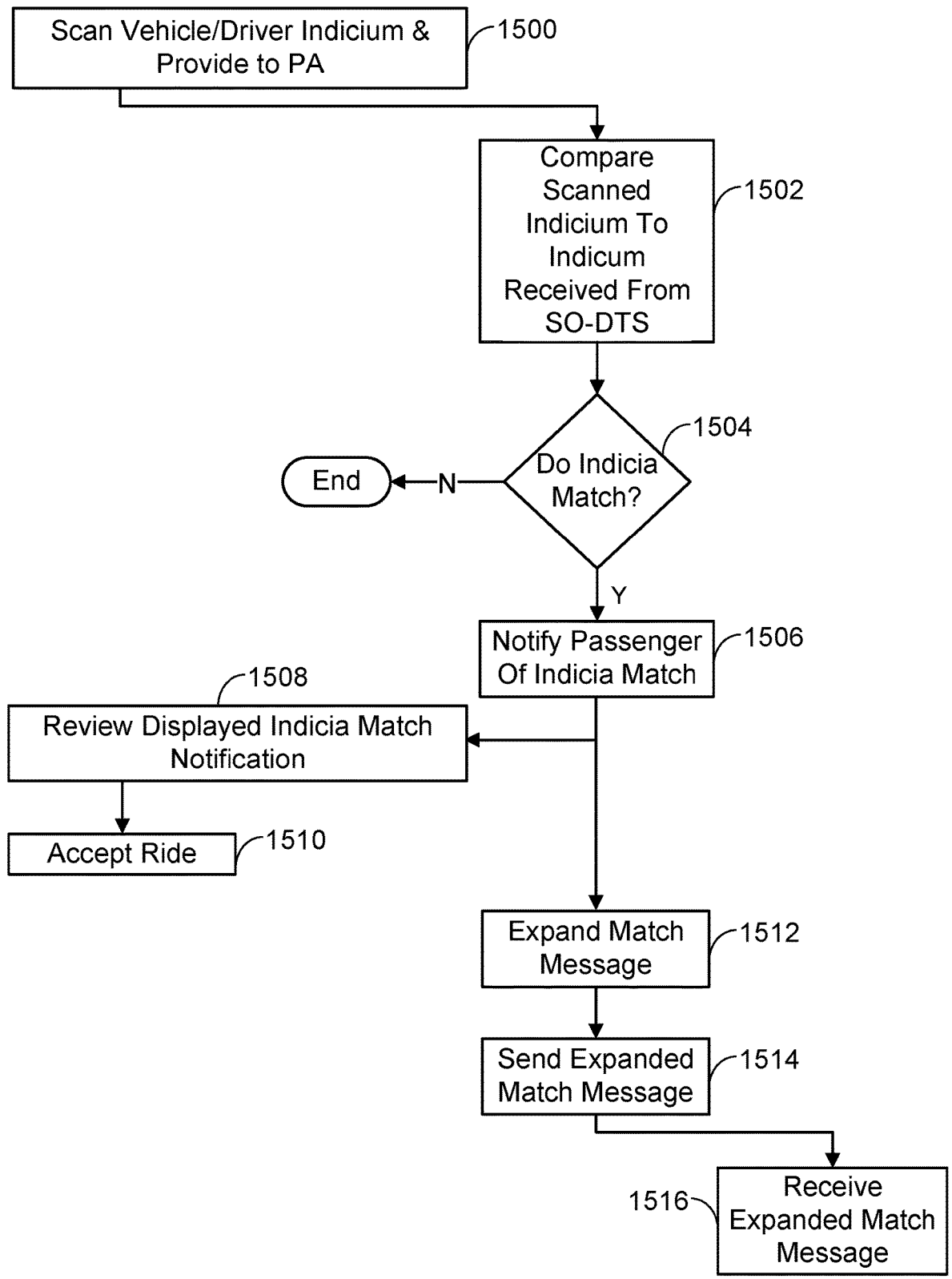
FIG. 15 is a flow diagram illustrating an exemplary implementation, in simplified form, of sub-programs for confirming the identity of the vehicle, or its driver, or both where the SO-DTS sends vehicle/driver identity data in the form of a vehicle/driver identification indicium to the passenger application running on the passenger's mobile computing device.

The same vehicle/driver identification indicium is also displayed in the vehicle in a place not viewable from the outside (to prevent it from being easily copied) and/or the driver would present the vehicle/driver identification indicium in some form (e.g., displayed on the driver's mobile computing device or printed on a card, and so on) to the passenger. Referring to FIG. 15, the passenger scans the vehicle/driver identification indicium with their mobile computing device and provides it to the passenger application (action 1500). The passenger application then compares the scanned indicium data to the indicium received from the SO-DTS (action 1502) to determine if there is a match (action 1504). If not, the passenger can refuse the ride and the program ends. If, however, the indicia match, then the passenger is notified via their mobile computing device (action 1506). For example, but without limitation, the passenger's mobile computing device can display an indicia match indication to the passenger for review (action 1508). The passenger can then accept the ride (action 1510).

In some implementations, the aforementioned match message is expanded to include an indication that the vehicle, or its driver, or both, correspond to the vehicle/driver's identity data which was provided by the SO-DTS. If the passenger personally determines whether the vehicle, or its driver, or both, correspond to the vehicle/driver identity data, then referring again to FIG. 14, the passenger application expands the match message (action 1412) to confirm that the passenger has indicated via the passenger application that the vehicle, or its driver, or both, correspond to the identity data. The expanded match message is then sent to (action 1414) and received by (action 1416) the SO-DTS. If the previously-described vehicle/driver identification indicium scheme is employed, then referring again to FIG. 15, the passenger application expands the match message (action 1512) to confirm that the passenger has scanned the vehicle/driver identification indicium from the vehicle or driver using the passenger's mobile computing device, that the scanned vehicle/driver identification indicium was compared to the indicium received from the SO-DTS to determine if they match, and that a match has been found. The match message is then sent to (action 1514) and received by (action 1516) the SO-DTS As discussed previously, it can also be important for the vehicle/driver to confirm the identity of a passenger who presents themselves as being the person who requested transportation from the SO-DTS and was assigned to the vehicle/driver. This is advantageous not only for the vehicle/driver's safety, but also ensure that the "legitimate" passenger is not left without transportation. To this end, in one passenger application-centric implementation, one or more security measures are initiated that include adding encrypted passenger identity data pertaining to the identification of the passenger to the encrypted data package generated by the passenger application. The rest of the security measures are generally the same as described previously in reference to FIGS. 6-9.

1.1 Encrypted Data Package Encoding

In general, any encoding scheme capable of encoding the information in the encrypted data package in a manner that would allow the encoded information to be displayed by the vehicle and scanned using the passenger's mobile computing device can be employed in the SO-DTS implementations described herein. For example, in one implementation, the encrypted data package encoding is a machine-readable optical barcode. Depending on how much data needs to be displayed, various barcode types can be employed. A 1-dimensional barcode scheme could be employed if only a small amount of data needs to be displayed. If the data requirement is greater, a 2-dimensional, matrix-type barcode scheme can be used, such as the Quick Response Code (QR-code), iQR code, SQRC, frame QR code, or the proposed High Capacity Colored 2-Dimensional (HCC2D) code.

1.2 Encrypted Data Package Display

In general, any display that is capable of displaying the encoded encrypted data package so that it is scannable by the passenger's mobile computing device in an outdoor setting either in daylight or at night can be employed. Light-emitting diode (LED) displays, liquid crystal displays (LCDs), electroluminescent displays (ELDs), electronic paper displays, and so on are examples of the types of commercially available electronic displays that could be employed in the SO-DTS implementations described herein. In one implementation, the display is a battery-powered, portable device that is in wireless communication with the vehicle/driver's mobile computing device. This type of display could be affixed to the interior of a window of the vehicle, or held in place in some other manner, so that it faces outward. Multiple displays of this type could be employed so that the displayed encrypted data package can be viewed from different sides of the vehicle. In another implementation, the display is connected to vehicle power.

For instance, the display could be a large, two-sided roof mounted display that displays the encrypted data package on both sides. However, this type of display could still be wirelessly connected to the vehicle/driver's mobile computing device. In yet another implementation, the display could be of the type that projects images on the inside of the window of the vehicle that are visible from the exterior using technology similar the automotive heads-up displays. In one implementation, instead of an electronic display, the encrypted data package is printed on paper using a mobile printer device, and the paper is affixed to the window of the vehicle so as to be visible from the exterior.

The electronic displays described above are generally visible light displays that are scannable by current mobile computing devices. However, in one implementation, the electronic display employed has the capability to display the encrypted data package using non-visible light frequencies (e.g., infrared), and the passenger's mobile computing device has the capability to scan images displayed at the non-visible light frequency. In this implementation, the display would display the encrypted data package in a non-visible light frequency, and another image that is not the encrypted data package using visible light frequencies. A person viewing the display would see the visible light image, but not the encrypted data package. For example, the visible light image might be text or a logo indicative of the SO-DTS. However, when the display is scanned using the passenger's mobile computing device, which is sensitive to the non-visible light frequency being employed, the encrypted data package is captured.

2.0 Other Implementations

While the secure on-demand transportation service has been described by specific reference to implementations thereof, it is understood that variations and modifications thereof can be made without departing from the true spirit and scope of the secure on-demand transportation service. For example, in the previously-described implementations, the encrypted data package is always provided to the vehicle application. However, this need not be the case. In one alternate implementation, the SO-DTS (or in one version the passenger application) provides the necessary data and encryption tools to the vehicle application to generate the encrypted data package itself prior to displaying it. In yet another alternate implementation, a cloud-based SO-DTS is not employed. Instead, the vehicle application takes the role of the SO-DTS.

It is further noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

3.0 Exemplary Operating Environments

Figure 16:
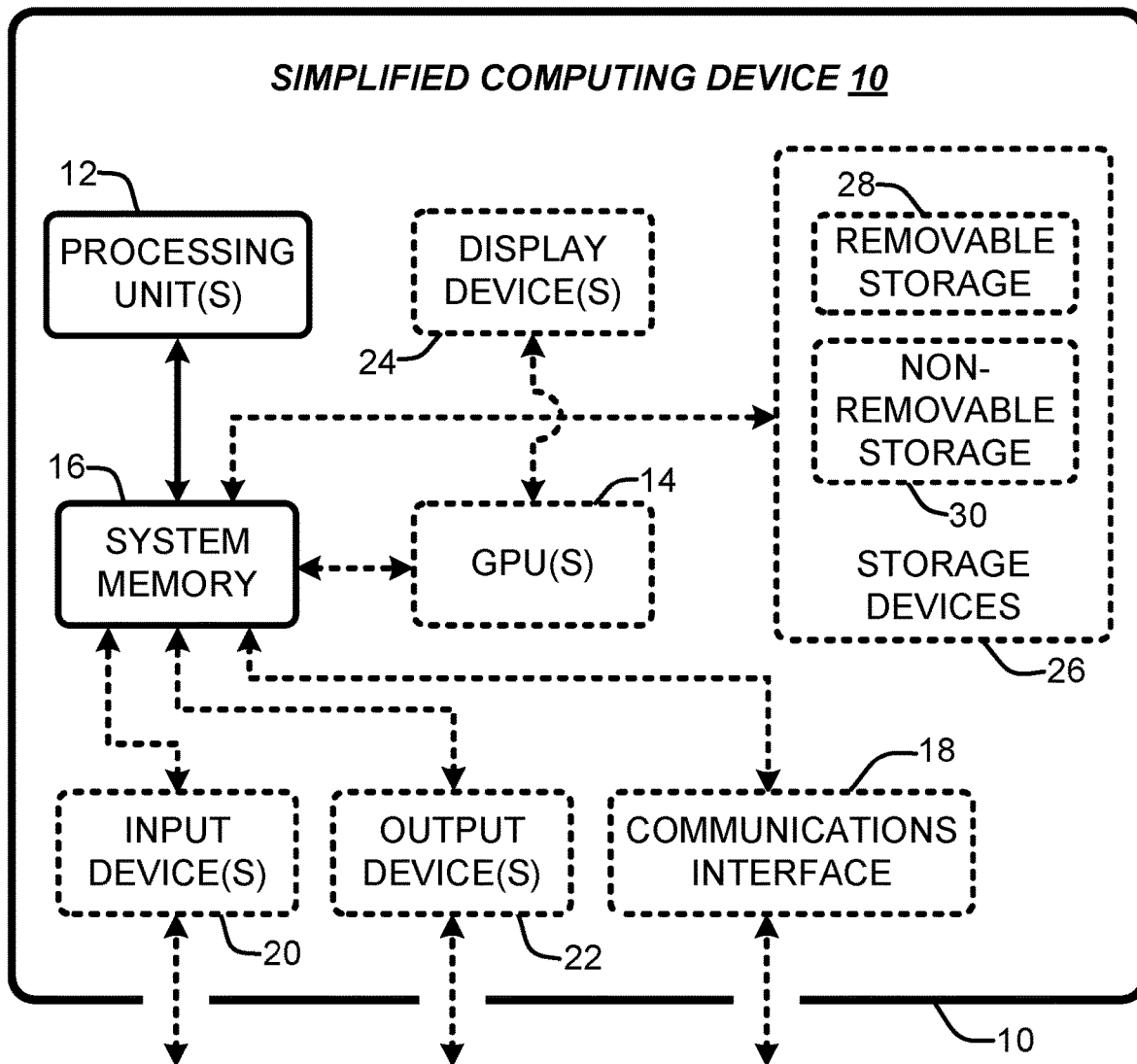
FIG. 16 is a diagram illustrating a simplified example of a general-purpose computer system on which various implementations and elements of the secure on-demand transportation service, as described herein, may be realized.

The secure on-demand transportation service implementations described herein are operational within numerous types of general purpose or special purpose computing system environments or configurations. FIG. 16 illustrates a simplified example of a general-purpose computer system on which various implementations and elements of the secure on-demand transportation service, as described herein, may be implemented. It is noted that any boxes that are represented by broken or dashed lines in the simplified computing device 10 shown in FIG. 16 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the secure on-demand transportation service implementations described herein, the device should have a sufficient computational capability and system memory to enable basic computational operations. In particular, the computational capability of the simplified computing device 10 shown in FIG. 16 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the secure on-demand transportation service implementations described herein, including input, output, control, feedback, and response to one or more users or other devices or systems associated with the secure on-demand transportation service implementations, are enabled by a variety of Natural User Interface (NUI) scenarios. The NUI techniques and scenarios enabled by the secure on-demand transportation service implementations include, but are not limited to, interface technologies that allow one or more users user to interact with the secure on-demand transportation service implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the secure on-demand transportation service implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the secure on-demand transportation service implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 16 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various secure on-demand transportation service implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The secure on-demand transportation service implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The secure on-demand transportation service implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. A system for providing on-demand transportation to passenger at a specified pick-up location, comprising:
a secure on-demand transportation service comprising one or more computing devices, and a secure on-demand transportation computer program having plurality of sub-programs executable by said computing device or devices, wherein the sub-programs configure said computing device or devices to,
receive a transportation request from a passenger application running on a passenger's mobile computing device, said request specifying a pick-up location,
assign a vehicle to provide the requested transportation and provide the specified pick-up location to a vehicle application running on a mobile computing device associated with the assigned vehicle, or a driver of the vehicle, or both,
generate an encrypted data package comprising encrypted information that is unique to the current transportation request and which when decrypted is used to identify the current transportation request and differentiate it from other transportation requests, and which further comprises encrypted identity data pertaining to the identification of the assigned vehicle, or the driver of the vehicle, or both, said encrypted data package being displayable on an externally visible display associated with the vehicle and scannable by an image sensor disposed in the passengers mobile, computing device,
provide the encrypted data package to the vehicle application, said encrypted data package to be displayed via the externally visible display at the pick-up location,
provide the encrypted data package to the passenger application, wherein the encrypted data package displayed on the externally visible display associated with the vehicle when the vehicle arrives at the pick-up location is to be scanned by the passenger using the passengers mobile computing device, which upon scanning causes the passenger application running on a passenger's mobile computing device to decrypt the encrypted information and compare the decrypted information to corresponding data decrypted from the encrypted data package received by the passenger application to determine if there is a match, and whenever a match has occurred, at least informing the passenger via the passenger's mobile computing device that the vehicle, or its driver, or both, correspond to the decrypted identity, data, and
receiving a match message from the passenger application via the passenger's mobile computing device, said match message indicating a match has occurred thereby confirming that the vehicle has arrived at the pick-up location and that the passenger has found the vehicle.

2. The system of claim 1, wherein encrypted identity data is an encrypted link to the secure on-demand transportation service where information about the identity of the assigned vehicle, or the driver of the vehicle, or both is obtainable.

3. The system of claim 1, wherein the encrypted identity data includes at least one of an image of the vehicle, an image of the driver, a license plate number associated with the vehicle, a driver's license number associated with the driver, a vehicle identifying number other than the vehicle license plate number, a driver identifying number other than the driver's license number.

4. The system of claim 1, wherein the sub-program for receiving a match message from the passenger application via the passenger's mobile computing device, comprises receiving in said match message a confirmation that the encrypted identity data has been decrypted and provided to the passenger who has indicated via the passenger application that the vehicle, or its driver, or both, correspond to the decrypted identity data.

5. The system of claim 1, wherein the encrypted identity data once scanned and decrypted takes the form of a non-human readable vehicle/drive identification indicium, and wherein the vehicle/driver identification indicium is displayed in the vehicle in a place not visible from the exterior or is presentable to the passenger by the driver, and wherein the sub-program for receiving a match message from the passenger application via the passenger's mobile computing device, comprises receiving in said match message a confirmation that the identity data has been scanned from the encrypted data package, that the passenger has scanned the vehicle/driver identification indicium using the passenger's mobile computing device, that the scanned vehicle/driver identification indicium was compared by the passenger application to the identify data obtained from the encrypted data package to determine if they match, and that a match has been found.

6. The system of claim 1, wherein the encrypted data package further comprises encrypted identity data pertaining to the identification of the secure on-demand transportation service.

7. The system of claim 1, wherein the encrypted data package further comprises encrypted passenger identity data pertaining to the identification of the passenger.

8. The system of claim 7, wherein the encrypted passenger identity data is an encrypted link to the secure on-demand transportation service where information about the identity of the passenger is obtainable.

9. The system of claim 7, wherein the encrypted passenger identity data includes at least one of an image of the passenger, or a number associated with an identification carried by the passenger.

10. The system of claim 7, further comprising a subprogram for receiving a passenger verification message from the vehicle application via the mobile computing device associated with the assigned vehicle, or a driver of the vehicle, or both, said passenger verification message indicating that the passenger who presented themselves to the vehicle, or driver, or both for transportation is the person who requested the transportation and was assigned to the vehicle, wherein said passenger verification message comprises confirmation that the encrypted passenger identity data has been decrypted by the vehicle application and provided to the vehicle, or driver, or both who has indicated via the vehicle application that the passenger corresponds to the decrypted passenger identity data.

11. The system of claim 7, wherein the encrypted passenger identity data takes the form of a non-human readable passenger identification indicium which is provided by the secure on-demand transportation service in encrypted form in the encrypted data package to the vehicle application along with a decryption tool for decrypting the passenger identification indicium and provided to the passenger application by the secure on-demand transportation service in unencrypted form, and wherein the system further comprising a subprogram for receiving a passenger verification message from the vehicle application via the mobile computing device associated with the assigned vehicle, or a driver of the vehicle, or both, said passenger verification message indicating that the passenger who presented themselves to the vehicle, or driver, or both for transportation is the person who requested the transportation and was assigned to the vehicle, wherein said passenger verification message comprises confirmation that the passenger has presented the passenger identification indicium to the vehicle, or the driver, or both, and that the vehicle, or the driver, or both have scanned passenger identification indicium presented by the passenger, and the vehicle application has compared the scanned indicium to a decrypted version of the passenger identification indicium found in the encrypted data package or obtained via a link found in the encrypted data package to determine if the indicia match, and that a match has been found.

12. A system for providing on-demand transportation to a passenger at a specified pickup location, comprising:
a secure on-demand transportation service comprising one or more computing devices, and a secure on-demand transportation computer program having a plurality of sub-programs executable by said computing device or devices, wherein the sub-programs configure said computing device or devices to,
receive a transportation request from a passenger application running on a passenger's mobile computing device, said request specifying a pick-up location,
assign a vehicle to provide the requested transportation and provide the specified pick-up location to a vehicle application running on a mobile computing device associated with the assigned vehicle, or a driver of the vehicle, or both,
generate an encrypted data package comprising encrypted information that is unique to the current transportation request, and which further comprises encrypted identity data pertaining to the identification of the assigned vehicle, or the driver of the vehicle, or both, said encrypted data package being displayable on an externally visible display associated with the vehicle and scannable by an image sensor disposed in the passengers mobile computing device,
provide the encrypted data package to the vehicle application, said encrypted data package to be displayed via the externally visible display at the pick-up location,
generate a security data package comprising said information that is unique to the current transportation request and the identity of the vehicle or its driver, or both,
provide the security data package to the passenger application, wherein the information that is unique to the current transportation request and the identity of the vehicle, or its driver, or both found in the security data package is to be compared to information obtained when the encrypted data package displayed on the externally visible display associated with the vehicle when the vehicle arrives at, the pick-up location is scanned by the passenger and decrypted using the passenger application which comprises a decryption tool that is capable of decrypting the encrypted information found in the encrypted data package to determine if there is a match, and whenever a match has occurred, at least informing the passenger via the passenger's mobile computing device that the vehicle, or its driver, or both, correspond to the decrypted identity data, and
receiving a match message from the passenger application via the passenger's mobile computing device, said match message indicating a match has occurred thereby confirming that the vehicle has arrived at the pick-up location and that the passenger has found the vehicle.

13. The system of claim 12, wherein the sub-program for receiving a match message from the passenger application via the passenger's mobile computing device, comprises receiving in said match message a confirmation that the identity data was provided to the passenger who indicated via the passenger application that the vehicle, or its driver, or both, correspond to the identity data.

14. The system of claim 12, wherein the identity data takes the form of a non-human readable identification indicium that graphically encodes information pertaining to the vehicle, or the driver, or both, and wherein the identification indicium is displayed in the vehicle in a place not visible from the exterior or is presentable to the passenger by the driver, and wherein the sub-program for receiving a match message from the passenger application via the passenger's mobile computing device, comprises receiving in said match message a confirmation that the passenger has scanned the identification indicium displayed in the vehicle or presented by the driver using the passenger's mobile computing device, that the scanned identification indicium was compared by the passenger application to the identification indicium received in the security data package to determine if the indicia match, and that a match has been found.

15. The system of claim 12, wherein the encrypted data package further comprises passenger identity data pertaining to the identification of the passenger.

16. The system of claim 15, further comprising a subprogram for receiving a passenger verification message from the vehicle application via the mobile computing device associated with the assigned vehicle, or a driver of the vehicle, or both, said passenger verification message indicating that the passenger who presented themselves to the vehicle, or driver, or both for transportation is the person who requested the transportation and was assigned to the vehicle, wherein said passenger verification message comprises confirmation that the passenger identity data that was provided to the vehicle, or driver, or both corresponds to the passenger.

17. The system of claim 15, wherein the passenger identity data takes the form of a nonhuman readable passenger identification indicium that graphically encodes information pertaining to the passenger which was also provided to the passenger application, and wherein the system further comprises a subprogram for receiving a passenger verification message from the vehicle application via the mobile computing device associated with the assigned vehicle, or a driver of the vehicle, or both, said passenger verification message confirming that the passenger has presented the passenger identification indicium using the passenger's mobile computing device, that the vehicle, or the driver, or both have scanned passenger identification indicium presented by the passenger, and that the vehicle application has compared the scanned passenger identification indicium to the received passenger identification indicium to determine if the indicia match, and that a match has been found.

18. A system for providing on-demand transportation to a passenger at a specified pick-up location, comprising:
a secure on-demand transportation application resident on a computing device associated with the passenger, and a secure on-demand transportation application computer program having a plurality of sub-programs executable by said passenger computing device, wherein the sub-programs configure said passenger computing device to,
send a transportation request to a secure on-demand transportation service, said request specifying the pick-up location,
receive information pertaining to a vehicle assigned to provide the requested transportation comprising the identification of the assigned vehicle, or the driver of the vehicle, or both,
generate an encrypted data package comprising encrypted information that is unique to the current transportation request, and which further comprises encrypted identity data pertaining to the identification of the assigned vehicle, or the driver of the vehicle, or both, said encrypted data package being displayable on an externally visible display associated with the assigned vehicle and scannable by an image sensor disposed in the passenger mobile computing device,
send the encrypted data package to a vehicle application running on a mobile computing device associated with the assigned vehicle, or a driver of the vehicle, or both, said encrypted data package to be displayed via the externally visible display at the pick-up location,
obtain data scanned by the passenger mobile computing device from the encrypted data package displayed on the externally visible display associated with the vehicle when the vehicle arrives at the pick-up location,
decrypt the scanned data using the passenger application which comprises a decryption tool that is capable of decrypting the encrypted information found in the scanned encrypted data package and compare the scanned data to corresponding data found in the received information to determine if there is a match, and
whenever a match has occurred, at least inform the passenger via the passenger mobile computing device that the vehicle, or its driver, or both, correspond to the decrypted identity data.

19. The system of claim 18, further comprising a subprogram for sending a match message to the secure on-demand transportation service indicating a match has occurred thereby confirming that the vehicle has arrived at the pick-up location and that the passenger has found the vehicle.

20. The system of claim 18, further comprising a subprogram for sending a match message to the secure on-demand transportation service indicating a match has occurred thereby confirming that the vehicle has arrived at the pick-up location and that the passenger has found the vehicle, and that the identity data pertaining to the identification of the assigned vehicle, or the driver of the vehicle, or both corresponds to the vehicle that arrived at the pick-up location, or its driver, or both.

21. The system of claim 18, wherein the identity data received from the secure on-demand transportation service takes the form of a non-human readable identification indicium that graphically encodes the information pertaining to the vehicle, or the driver, or both, and wherein the same identification indicium is displayed in the vehicle in a place not visible from the exterior presentable to the passenger by the driver, and wherein the system further comprises a sub-program for sending a match message to the secure on-demand transportation service comprising a confirmation that the passenger has scanned the identification indicium displayed in the vehicle or presented by the driver using the passenger's mobile computing device, that the scanned identification indicium was compared to the identification indicium received from the secure on-demand transportation service to determine if the indicia match, and that a match has been found.

22. The system of claim 18, wherein the information pertaining to a vehicle assigned to provide the requested transportation is received from the secure on-demand transportation service.

23. The system of claim 18, wherein the information pertaining to a vehicle assigned to provide the requested transportation is received from the vehicle application.

24. The system of claim 18, further comprising a subprogram for sending passenger identity data pertaining to the identification of the passenger to the vehicle application.

\* \* \* \* \*